United States Patent
Baek et al.

(10) Patent No.: US 11,252,684 B2
(45) Date of Patent: Feb. 15, 2022

(54) V2X COMMUNICATION DEVICE AND COMMUNICATION METHOD THEREOF

(71) Applicant: LG ELECTRONICS INC., Seoul (KR)

(72) Inventors: Jongseob Baek, Seoul (KR); Woosuk Ko, Seoul (KR); Jinwoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 154 days.

(21) Appl. No.: 16/644,376

(22) PCT Filed: Sep. 4, 2017

(86) PCT No.: PCT/KR2017/009641
§ 371 (c)(1),
(2) Date: Mar. 4, 2020

(87) PCT Pub. No.: WO2019/045154
PCT Pub. Date: Mar. 7, 2019

(65) Prior Publication Data
US 2021/0068063 A1    Mar. 4, 2021

(51) Int. Cl.
*H04W 56/00* (2009.01)
*H04W 4/40* (2018.01)

(52) U.S. Cl.
CPC .......... *H04W 56/001* (2013.01); *H04W 4/40* (2018.02)

(58) Field of Classification Search
CPC . H04W 56/001; H04W 4/40; H04W 74/0841; H04W 74/006; H04W 56/00
See application file for complete search history.

(56) References Cited

U.S. PATENT DOCUMENTS

| | | |
|---|---|---|
| 2016/0286550 A1 | 9/2016 | Zhang et al. |
| 2018/0242190 A1* | 8/2018 | Khoryaev ............ H04L 47/283 |
| 2019/0097751 A1* | 3/2019 | Li ........................ H04L 5/0007 |
| 2021/0050953 A1* | 2/2021 | Park ................... H04W 72/1263 |

FOREIGN PATENT DOCUMENTS

| | | |
|---|---|---|
| WO | WO2016198320 | 12/2016 |
| WO | WO2017023150 | 2/2017 |

OTHER PUBLICATIONS

Extended European Search Report in EP Appln. No. 17923881.2, dated Feb. 5, 2021, 6 pages.
Intelligent Transport Systems, "Vehicular Communications Channel Specifications 5GHz," XP014073186, ETSI TS 102 724, V0.0.10, dated Oct. 2011, 23 pages.
Behravesh et al., "Evaluation of the IEEE 802.11p Multi-Channel Operation in Vehicular Networks," PeerJ Preprints, dated Dec. 10, 2016, 9 pages.
Li et al., "An RSU-Coordinated Synchronous Multi-Channel MAC Scheme for Vehicular Ad Hoc Networks," IEEE Access: The journal for rapid open access publishing, dated Dec. 17, 2015, 10 pages.
PCT International Search Report in International Application No. PCT/KR2017/009641, dated Jun. 5, 2018, 5 pages (with English translation).

* cited by examiner

*Primary Examiner* — Kyaw Z Soe
(74) *Attorney, Agent, or Firm* — Fish & Richardson P.C.

(57) ABSTRACT

Disclosed is a communication method of a V2X communication device. The communication method of a V2X communication device comprises the steps of: accessing a control channel (CCH) by using a CCH transceiver; and accessing a service channel (SCH) by using a SCH transceiver.

15 Claims, 14 Drawing Sheets

FIG. 2
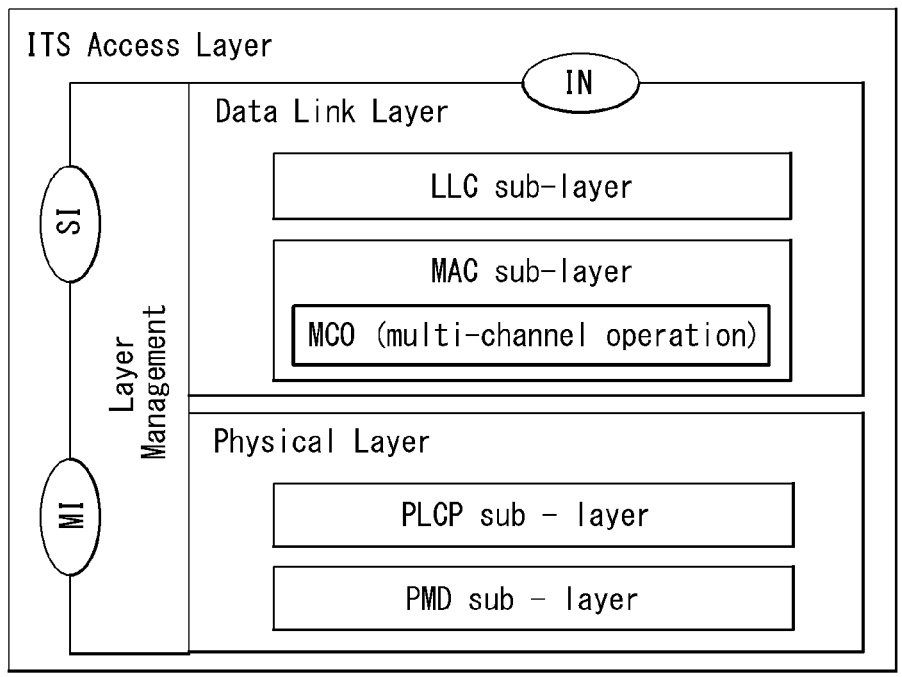
FIG. 3
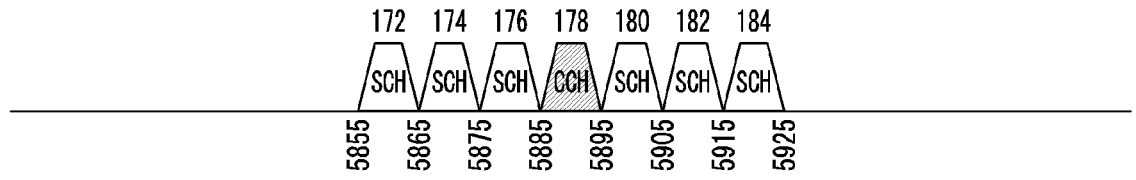
(a)
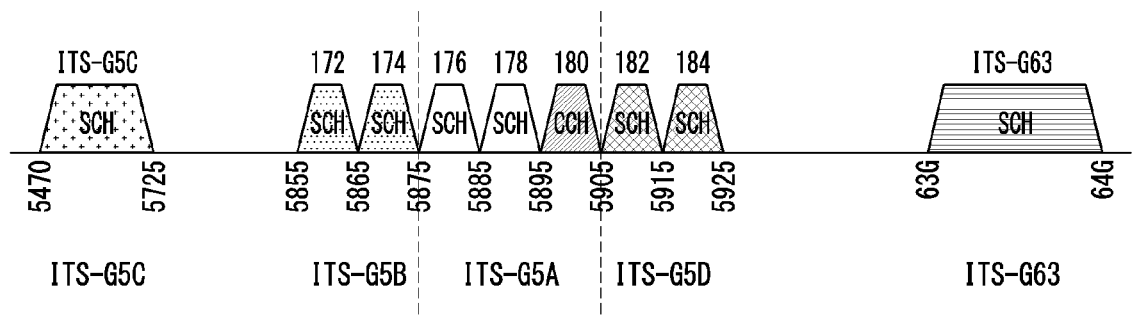
(b)

FIG. 5
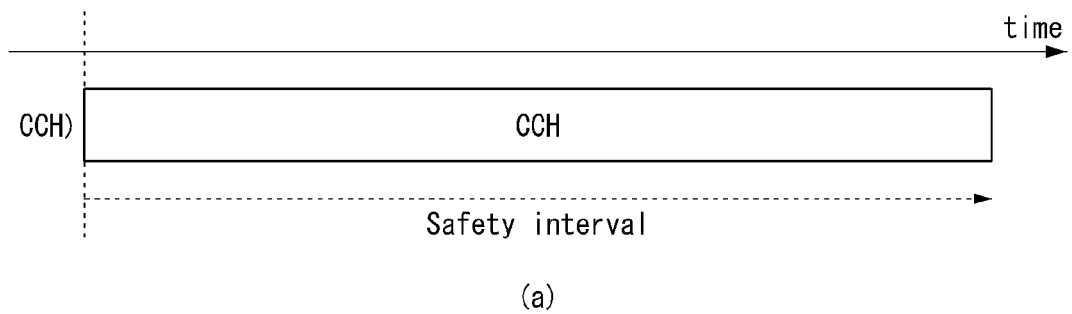
(a)
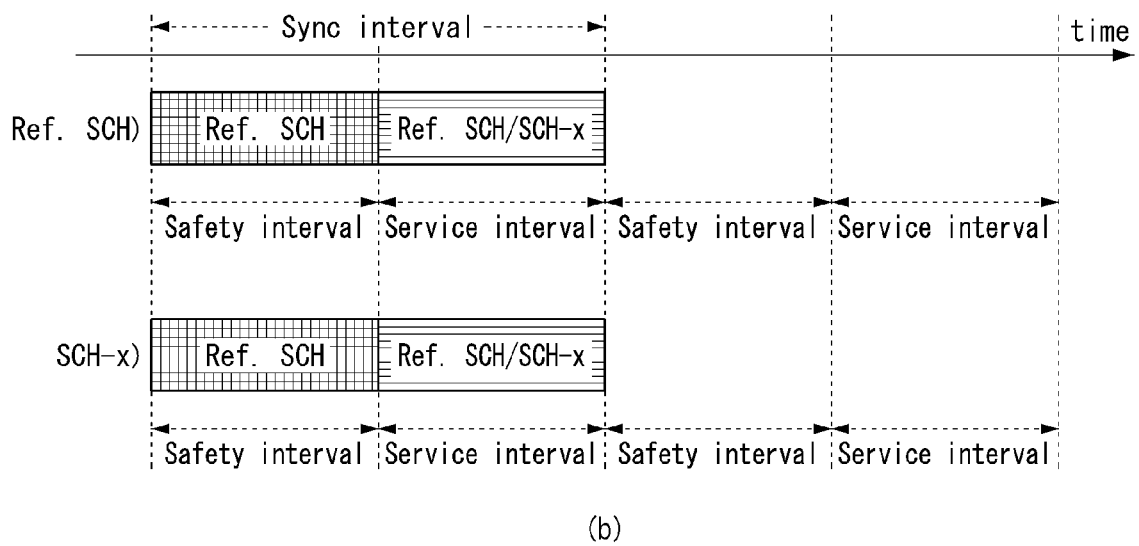
(b)

FIG. 6
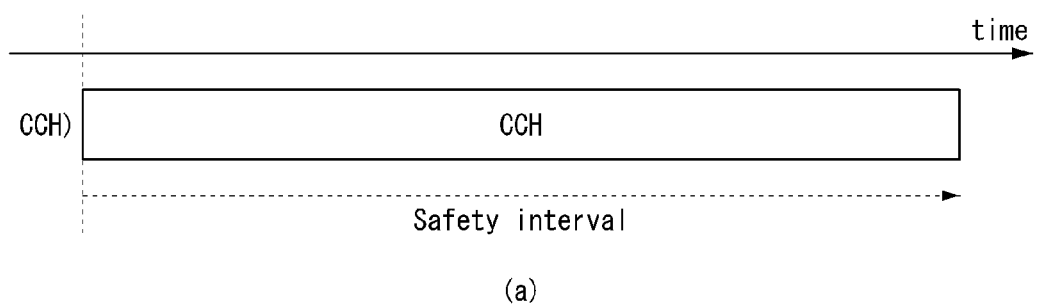
(a)
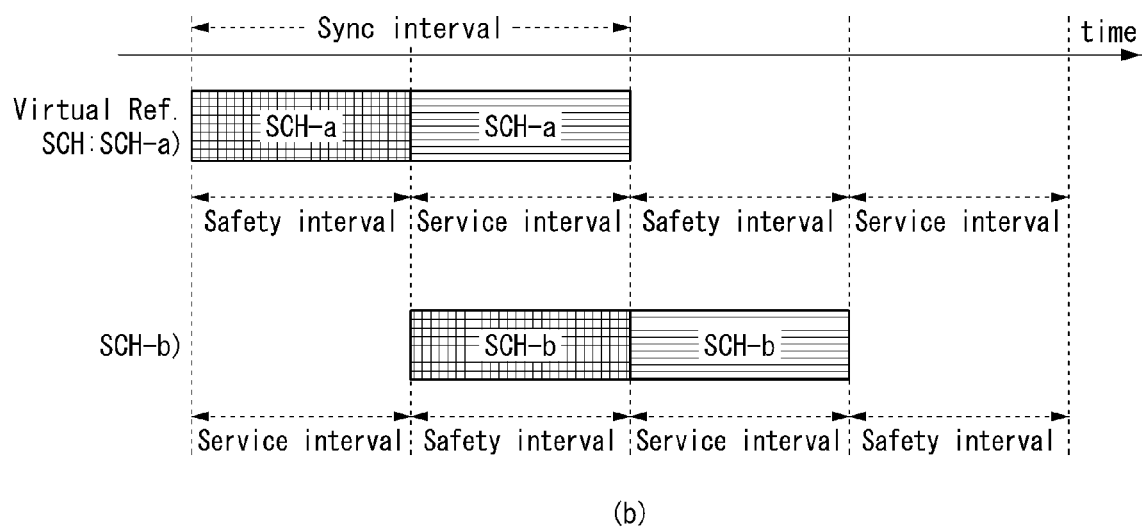
(b)

V2X COMMUNICATION DEVICE AND COMMUNICATION METHOD THEREOF

CROSS-REFERENCE TO RELATED APPLICATIONS

This application is the National Stage filing under 35 U.S.C. § 371 of International Application No. PCT/KR2017/009641, filed on Sep. 4, 2017, the contents of which are all hereby incorporated by reference herein in their entirety.

TECHNICAL FIELD

The present disclosure relates to an apparatus for V2X communication and a communication method thereof and, more particularly, to an efficient multi-channel access method using a multi-antenna.

BACKGROUND ART

Nowadays, a vehicle is becoming the results of a complex industrial technology in which electrical, electronic, and communication technologies have been converged out of the mechanical engineering base. In this regard, the vehicle is called a smart car. The smart car connects a driver, a vehicle, and traffic infrastructure to provide various user-customized mobile services as well as traditional vehicle technologies, such as traffic safety/congestion solution. Such connectivity may be implemented using a vehicle to everything (V2X) communication technology.

DISCLOSURE

Technical Problem

Various services may be provided through V2X communication. Furthermore, a plurality of frequency bands has been used to provide various services. In such an environment, due to the nature of vehicle communication, to transfer and provide safety services with high reliability is a very important problem. Particularly, it is necessary to prevent channel congestion for a multi-channel operation. Furthermore, there is a need for a multi-channel access method for efficiently using a limited frequency resource.

Technical Solution

A V2X communication apparatus according to an embodiment of the disclosure is a V2X communication apparatus, including a memory storing data, a communication unit transmitting or receiving a radio signal, wherein the communication unit includes a control channel (CCH) transceiver accessing and communicating with a CCH and a service channel (SCH) transceiver accessing and communicating with an SCH, and a processor configured to control the communication unit. The V2X communication apparatus may be configured to access a first SCH and receive a safety message or first service information message during a first interval, wherein the service information message indicates an available service and communication access technology information for service reception, receive service in the first SCH based on the first service information message or access a second SCH during a second interval contiguous to the first interval, and receive a safety message or second service information message during a third interval when the second SCH is accessed.

In the V2X communication apparatus according to an embodiment of the disclosure, the access to the first SCH and the access to the second SCH are synchronized each other, and the start timing of the third interval is contiguous to the end timing of the first interval.

In the V2X communication apparatus according to an embodiment of the disclosure, the CCH access and the SCH access are performed based on a sync interval, the sync interval for the first SCH includes the first interval and the second interval, and the sync interval for the second SCH includes the third interval and a fourth interval.

The V2X communication apparatus according to an embodiment of the disclosure may receive service in the second SCH based on the second service information message or access the first SCH during the fourth interval.

A V2X communication apparatus according to an embodiment of the disclosure may receive service in the second SCH based on the second service information message or access the third SCH during the fourth interval, and may receive a safety message or third service information message during a fifth interval when the third SCH is accessed.

In the V2X communication apparatus according to an embodiment of the disclosure, the first SCH access, the second SCH access and the third SCH access are synchronized, the start timing of the third interval is contiguous to the end timing of the first interval, and the start timing of the fifth interval is contiguous to the end timing of the third interval.

Furthermore, a communication method of a V2X communication apparatus according to an embodiment of the disclosure includes accessing a control channel (CCH) using a CCH transceiver and accessing a service channel (SCH) using an SCH transceiver. Accessing the SCH may include accessing a first channel band and receiving a safety message or first service information message during a first interval, wherein the service information message indicates available service information and communication access technology information for service reception, receiving service in the first channel band based on the first service information message or accessing a second channel band during a second interval contiguous to the first interval, and receiving a safety message or second service information message during a third interval when the second channel band is accessed.

In the V2X communication apparatus according to an embodiment of the disclosure, accessing the first channel band and accessing the second channel band are synchronized, and the start timing of the third interval is contiguous to the end timing of the first interval.

In the V2X communication apparatus according to an embodiment of the disclosure, each of the first channel band and the second channel band may include a plurality of SCHs, and sync intervals for the plurality of SCHs included in each channel band may be identical.

Advantageous Effects

In the case of the sequential CA mode provided in the disclosure, a fixed reference safety interval operation, such as the base CA mode, is not necessary because the safety intervals of respective SCHs are disposed to not overlap each other. The sequential CA mode has excellent channel use efficiency compared to the base mode because an SCH-x can be used during the safety intervals of respective SCHs. In the sequential CA mode, the V2X apparatus can continuously transmit a safety message while sequentially moving to the safety interval of an SCH. Virtual continuous SCHs can operate, and robustness to channel fading according to a sequential channel change can be provided. The V2X communication apparatus can obtain V2X service information by receiving an SAM in each SCH because the safety intervals of respective SCHs do not overlap. A channel starvation problem can be minimized by providing only information for service, provided in each SCH, in a corresponding channel compared to the base mode in which a channel starvation problem may occur because SAMs for all SCH-xs are transmitted in one reference SCH.

In the case of the mixed CA mode provided in the disclosure, a channel starvation phenomenon can be minimized because the base CA mode is applied to only SCHs within a channel band. Furthermore, a problem in that a safety message cannot be received if transmission and reception vehicles are not synchronized as in the sequential CA can be minimized. The mixed CA mode provides advantages according to a reference SCH safety interval operation. A fixed reference safety interval operation, such as the base CA mode, is not necessary because the safety intervals of respective channel bands are disposed to not overlap each other. V2X service information provided in a channel band can be obtained through SAM reception during a reference SCH safety interval in each channel band. A channel starvation problem can be minimized by transmitting SAMs for all the SCHs of a channel band in one reference SCH. The V2X communication apparatus can transmit a safety message while sequentially moving to a reference SCH safety interval of a channel band. Accordingly, a virtual continuous SCH operation is possible, and robustness to channel fading according to a sequential channel change can be provided.

DESCRIPTION OF DRAWINGS

The accompany drawings, which are included to provide a further understanding of the disclosure and are incorporated in and constitute a part of this disclosure, illustrate embodiments of the disclosure and together with the description, serve to explain the principles of the disclosure.

FIG. 2 illustrates an ITS access layer according to an embodiment of the disclosure.

FIG. 3 illustrates multi-channel allocation used for an ITS system operation according to an embodiment of the disclosure.

FIG. 5 illustrates a multi-channel operation method according to an embodiment of the disclosure.

FIG. 6 illustrates a multi-channel operation method according to another embodiment of the disclosure.

BEST MODE

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by the applicant and meanings thereof are described in detail in the following description as needed. Accordingly, the disclosure should be understood based on the intended meaning of the term rather than a simple name or meaning of the term.

The disclosure relates to a V2X communication apparatus. The V2X communication apparatus may be included in an intelligent transport system (ITS) system, and may perform some of or all functions of the ITS system. The V2X communication apparatus may perform communication between vehicles, between a vehicle and infrastructure, a vehicle and a bicycle, and may perform communication with a mobile device. The V2X communication apparatus may be abbreviated as a V2X apparatus. In an embodiment, the V2X apparatus may correspond to the on board unit (OBU) of a vehicle or may be included in an OBU. The OBU may be referred to as an on board equipment (OBE). The V2X apparatus may correspond to the roadside unit (RSU) of infrastructure or may be included in an RSU. The RSU may be referred to as a roadside equipment (RSE). Alternatively, the V2X apparatus may correspond to an ITS station or may be included in an ITS station. All of a given OBU, RSU and mobile device that perform V2X communication may be referred to as an ITS station or a V2X communication apparatus.

Figure 1:
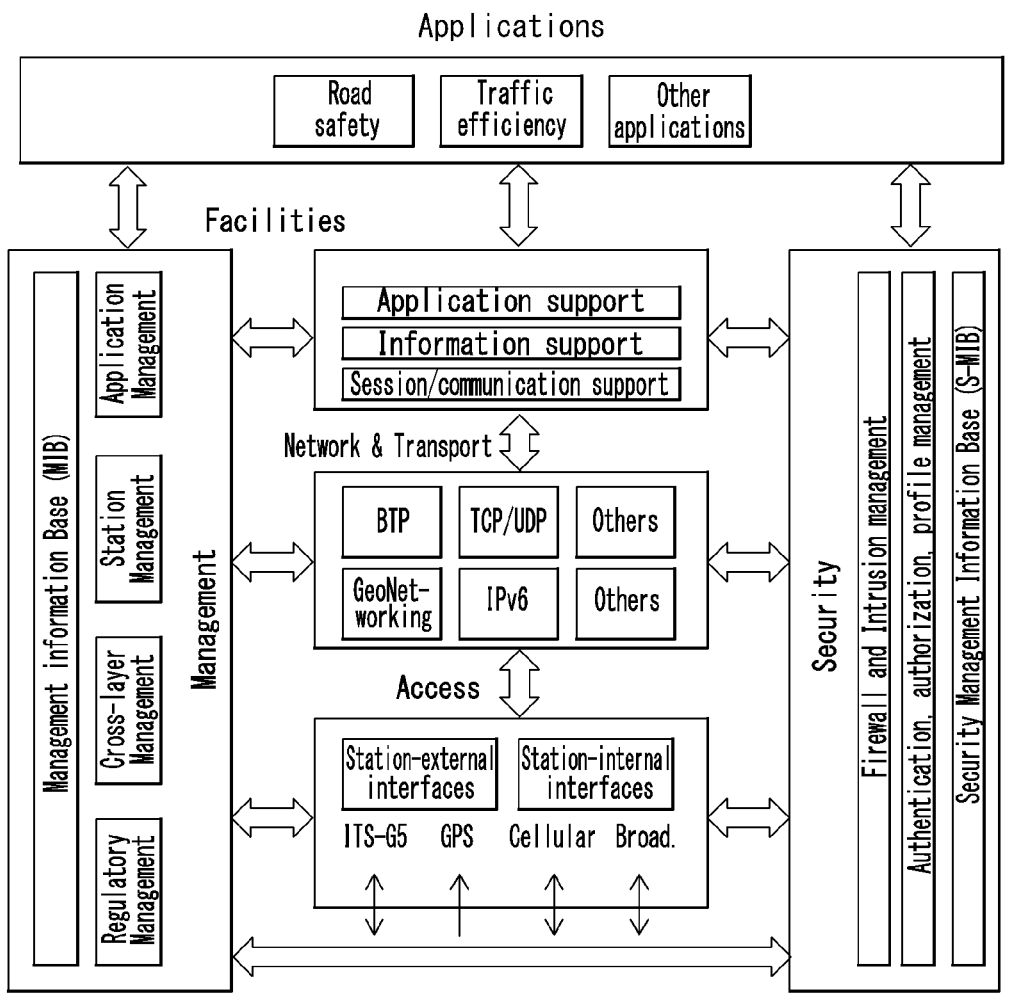
FIG. 1 illustrates a reference architecture of an Intelligent Transport System (ITS) station according to an embodiment of the disclosure.

FIG. 1 illustrates a reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogeneous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and has a large data capacity, it is considered to additionally use an ITS-G63 band in a superordinate frequency band based on 5.9 GHz and to use an ITS-G5 band in a subordinate frequency band. An efficient multi-channel operation method needs to be developed to provide high-quality service by appropriately allocating the service to various multi-channels in such an environment.

The CCH indicates a radio channel used for the exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and the communication of such general-purpose application data may be coordinated by service-related information such as WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provide information on at least one of the presence, location or communication state of the ITS station. The DENM provides information on a detected event. The DENM may provide information on a given driving condition or event detected by an ITS station. For example, the DENM may provide information on a situation, such as an emergency electronic brake, a vehicle accident, a vehicle problem or a traffic condition.

Figure 4:
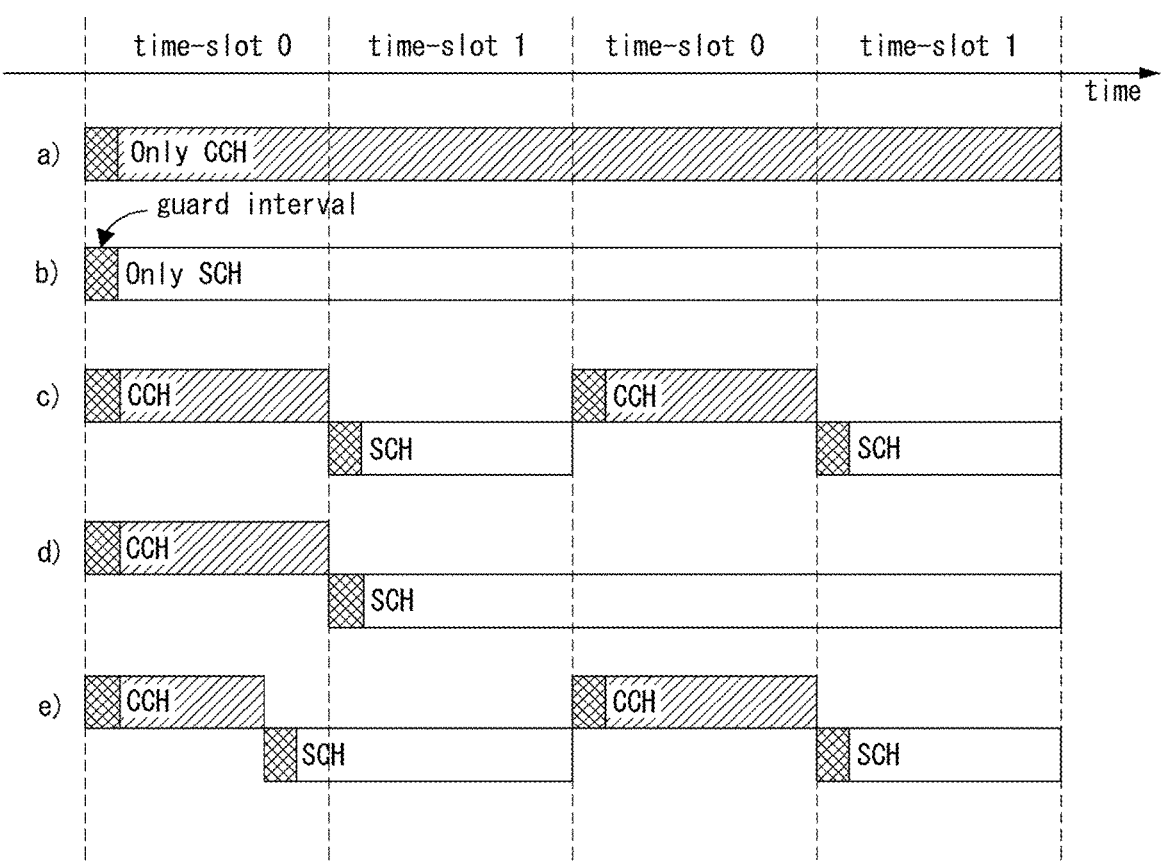
FIG. 4 illustrates a channel coordination mode of a multi-channel operation according to an embodiment of the disclosure.

FIG. 4 shows a channel coordination mode of a multi-channel operation according to an embodiment of the disclosure.

FIG. 4 shows (a) a continuous mode, (b) an altering mode, (c) an extended mode, and (d) an immediate mode, that is, channel coordination modes of a multi-channel operation. The channel coordination mode may indicate a method that a V2X device accesses a CCH and an SCH.

A V2X device may access at least one channel. In an embodiment, one radio device may monitor a CCH and exchange data via an SCH. For this purpose, a channel interval needs to be specified. FIG. 4 shows such a channel interval, that is, time slot allocation. Radio channel altering may be performed based on a synchronized interval in association with a common time base. The sync interval may include a plurality of time slots. Furthermore, the plurality of time slots may correspond to a CCH interval and an SCH interval. In such a case, the sync interval may include a CCH interval and an SCH interval. Traffic may be exchanged in a CCH during the CCH interval. A single-radio device participating in application-service may switch to an SCH during an SCH interval. Each of the CCH interval and the SCH interval may include a guard interval. Each interval may start with a guard interval.

In an embodiment, the exchange of multi-channel operation information and safety-related services information may be performed in a CCH during a CCH interval. Furthermore, negotiation for information exchange between a service provider and a user may be performed in a CCH during a CCH interval. A hardware timing operation for the channel altering of a V2X device may be initiated by a sync signal obtained through universal time coordinated (UTC) estimation. A channel sync may be performed every 1 pulse per second (PPS) section based on UTC.

In an embodiment, FIG. 4 is a channel coordination method of a multi-channel operation (MCO) described in IEEE 1609.4, and shows a method in which in a single physical layer, two MAC layers divide time and alternately use a CCH and different channel modes.

(a)&(b) continuous mode: the continuous mode is a mode in which each vehicle or all vehicles operate regardless of a time division basis, such as the time slot/CCH interval/SCH interval of FIG. 6. In the continuous mode, a V2X device may continuously receive operation information and safety-related services information of a multi-channel in a designated CCH or SCH, or an information exchange may be performed between a service provider and a user.

(c) altering mode: in the altering mode, each vehicle or all vehicles may receive operation information and safety-related services/information of a multi-channel during a CCH interval or may perform a negotiation process for an information exchange between a service provider/user. In the altering mode, each vehicle or all vehicles perform a service/information exchange between a service provider and a user during an SCH interval. In the altering mode, V2X devices may alternately perform communication through a CCH and an SCH during a configured CCH interval and SCH interval.

(d) extended mode: in the extended mode, communication during a CCH interval and an SCH interval may be performed as in the altering mode. However, a service/information exchange during an SCH interval may also be performed in a CCH interval. In an embodiment, a V2X device in the extended mode may transmit and receive control information during a CCH interval, and may maintain an SCH interval until the exchange of service/information is terminated when it enters the SCH interval.

(e) immediate mode: in the immediate mode, the communication of a V2X device may be performed as in the altering mode and/or the extended mode. However, a V2X device in the immediate mode may immediate change a channel to a designated SCH without waiting for the end of a CCH interval when negotiation for an information exchange is completed during the CCH interval, and may initiate an information exchange. As shown in FIG. 4, the extended mode and the immediate mode may be used together.

In the case of the channel coordination modes shown in FIG. 4, management information of a multi-channel and information exchange and negotiation for service provision may be performed only in a CCH during a CCH interval. Negotiation for receiving safety-related services and information or for an information exchange between a service provider and a user may also be performed only in a CCH during a CCH interval.

A guard interval may be included between a CCH interval and an SCH interval. The guard interval may enable a communication device to secure the time necessary for sync upon performing frequency altering and channel altering. Upon channel altering, a hardware timer operation may be started by a sync signal obtained through universal time coordinated (UTC) estimation. A channel sync may be synchronized every 1 pulse per second (PPS) section using UTC as a reference signal.

In an embodiment, a sync interval may include a CCH interval and an SCH interval. That is, one sync interval may include two time slots. The CCH interval and the SCH interval may correspond to a time slot 0 and a time slot 1, respectively. The start of a sync interval may be identical with the start of a common time reference second. A sync interval that is a positive number times may be included for 1 second.

The V2X communication apparatus may perform communication using a multichannel operation (MCO) technology using multiple antennas. In an embodiment, the ETSI MCO design described in ETSI TS 102 646-4-2 is designed by chiefly considering the following items.

A channel access (CA) method capable of effectively using a channel resource using a multi-antenna in a multi-channel needs to be provided.

A mechanism for enabling the V2X apparatus to effectively receive a service announcement message (SAM) that provides V2X service information and to move to a channel in which a corresponding service is provided needs to be provided.

A mechanism for minimizing an interference influence between adjacent channel which may occur when V2X transmission and reception using two or more multiple antennas and adjacent channels are performed in the same vehicle at the same time needs to be provided.

A control channel (CCH) is a basic channel in which a message related to traffic safety, such as a cooperative awareness message (CAM), a decentralized environmental notification message (DENM), a topology (TOPO), or a MAP, is provided. A safety message that has not been sufficiently provided in a CCH may be provided through an SCH. If a new type of a safety message is added, the added safety message may be provided in an SCH.

V2X services provided through a service channel (SCH) are announced through an SAM. The SAM may be provided through a well-known reference channel. For example, V2X service information provided in a channel band, such as ITS-G5A/B/D, may be provided through an SAM in a reference CCH. In this case, services may not be provided in the CCH because the provision of V2X services through the CCH may affect a safety message. V2X service information provided in each channel band may be provided through an SAM in an alternate reference SCH randomly designated within a channel band.

FIG. 5 illustrates a multi-channel operation method according to an embodiment of the disclosure.

The V2X communication apparatus may include a plurality of transceivers. A transceiver that accesses a CCH and performs communication in the CCH may be referred to as a CCH transceiver. A transceiver that accesses an SCH and performs communication in the SCH may be referred to as an SCH transceiver.

As in FIG. 5(*a*), the CCH transceiver of the V2X communication apparatus may monitor a CCH and perform communication in the CCH. The V2X communication apparatus may transmit or receive a safety message using the CCH transceiver. The safety message may be provided through contention without applying a multiplexing method.

As in FIG. 5(*b*), the SCH transceiver of the V2X communication apparatus may monitor an SCH and perform communication in the SCH. The V2X communication apparatus may transmit or receive a safety message, an SAM, or V2X services using the SCH transceiver.

An SCH may include a reference SCH and an SCH-x (x-th SCH, the remaining SCH other than the reference SCH in a channel in which the provision of V2X services are permitted). A channel bandwidth may be divided into a safety interval and a service interval with respect to each SCH. A safety message and an SAM may be provided in the safety interval. V2X services may be provided in the service interval. The safety interval and the service interval may be divided according to a time division multiplexing (TDM) method in a time domain.

In FIG. 5, a sync interval for SCH access overlaps each SCH. That is, an SCH transceiver performs communication on the same safety interval and service interval synchronized with each SCH. As in FIG. 5, a CA mode in which communication is performed based on the same safety interval/service interval as a sync interval synchronized with each SCH may be referred to as base CA or basic CA.

An SAM, that is, a service announcement message, is a message that announces a communication access technology used to access services and an available user service. The SAM may include provided services, a communication access technology, and another piece of information necessary to provide services. In the present disclosure, the SAM may be referred to as a service information message.

A reference SCH is a default channel in which an SCH transceiver is positioned if V2X service is not present. Synchronization between a basic safety interval and a service interval may be performed in a reference SCH. A safety message and an SAM may be provided through a reference SCH among SCHs. In an embodiment, the transmission of a safety message and an SAM is permitted during a safety interval, but the transmission of a safety message and an SAM may not be permitted during a service interval. The SAM may provide information on both services provided in a reference SCH and services provided through an SCH-x.

An SCH transceiver may access a reference SCH, and may transmit or receive a safety message during a safety interval. The SCH transceiver may access a reference SCH and transmit or receive an SAM during a safety interval, and may move to the reference SCH or SCH-x and transmit or receive V2X service during a service interval. The length of a sync interval may be the same as the sum of a safety interval and a service interval. That is, the sync interval may be divided into the safety interval and the service interval.

An SCH-x is a channel in which V2X service is provided. The transmission or reception of a safety message may not be permitted in the SCH-x. During a safety interval, an SCH transceiver may access a reference SCH and transmit or receive a safety message and an SAM message. In an embodiment, during a safety interval, the SCH transceiver may maintain an idle state. During the safety interval, the SCH transceiver may access an SCH corresponding to SCH a service interval and transmit or receive services in order to use an interested V2X service among services indicated by received SAM information.

A channel access method for a multi-channel may be applied in various road environments. At an intersection, congestion levels may be different depending on the intersection direction. Accordingly, it may be difficult to solve a congestion problem using the existing decentralized congestion control (DCC) mechanism. In this case, the congestion problem may be reduced by transmitting additional information on the safety interval of a reference SCH. In the case of an expressway/platooning, an SCH transceiver may move to a corresponding SCH-x using an SAM obtained through a reference SCH, and may participate in platooning. In an area/emergency in which multiple accidents occur, an SCH transceiver may transmit emergency situation information during the safety interval of a reference SCH.

FIG. 6 illustrates a multi-channel operation method according to another embodiment of the disclosure.

FIG. 6 is a multi-channel operation method according to an embodiment of the disclosure, and illustrates a sequential/in-sequence CA method.

As in FIG. 6(a), a CCH transceiver may transmit or receive a safety message in a CCH. As in FIG. 6(b), an SCH transceiver may transmit or receive a safety message/SAM and V2X service in an SCH.

In the embodiment of FIG. 6, the SCH includes a virtual reference SCH and an SCH-x (e.g., a common SCH such as an SCH-a or an SCH-b). Each SCH may be time-multiplexed (TDM) in a safety interval and a service interval. The use of a safety interval may be permitted for each SCH. In order to increase channel use efficiency, safety intervals may be configured to not overlap each other by relatively delaying a safety interval with respect to each channel. In the sequential CA mode, the sync interval of a subsequent accessing SCH may be delayed by the length of the safety interval of a previous accessing SCH.

The virtual reference SCH is a default channel positioned when the SCH transceiver is turned on. Synchronization between a basic safety interval and a service interval may be performed in the virtual reference SCH. Compared to the aforementioned reference SCH, the virtual reference SCH is a virtual channel for performing basic synchronization-related setup necessary for a CA operation. The virtual reference SCH may be randomly designated. A virtual reference SCH may not be configured according to circumstances. The length of the sync interval may be the sum of a safety interval and a service interval.

Safety intervals may be configured to not overlap each other by relatively delaying the safety intervals of respective SCHs with respect to an SCH-x (including a virtual reference SCH). The lengths of sync intervals defined for respective SCHs may be the same. A safety message may be transmitted in the safety interval of each SCH. Furthermore, the V2X apparatus may continuously transmit a safety message in the safety interval of each SCH while sequentially moving an SCH like a CCH.

An SAM transmitted in the safety interval of each SCH may include V2X service information provided in the corresponding SCH. From the viewpoint of a V2X service provider, an SAM transmitted in the safety interval of each SCH may include only V2X service information provided in the corresponding SCH. From a V2X service user viewpoint, if an SAM received during the safety interval of each SCH notifies that an interested V2X service is provided in the corresponding channel, the V2X apparatus may receive the corresponding service without a channel movement. From a V2X service user viewpoint, if it is known that there is no interested service from an SAM received in the safety interval of a corresponding SCH, the V2X apparatus may access a next SCH whose continuous movement has been reserved, and may confirm service provided in the channel by receiving the SAM in the safety interval of the accessed SCH.

Unlike in the embodiment of FIG. 5, in the embodiment of FIG. 6, a channel use capacity can be increased by allowing V2X service transmission and reception in another SCH during the safety interval of each SCH. There can be provide an effect in that a safety message is transmitted in one continuous virtual channel similar to a CCH because the safety message is transmitted using the safety interval of a continuous SCH. An SCH transceiver may transmit or receive a safety message and SAM information in each SCH by sequentially changing a channel starting from a given SCH.

Hereinafter, various embodiments of a sequential CA method and an embodiment in which virtual continuous SCHs are formed are described in detail.

Figure 7:
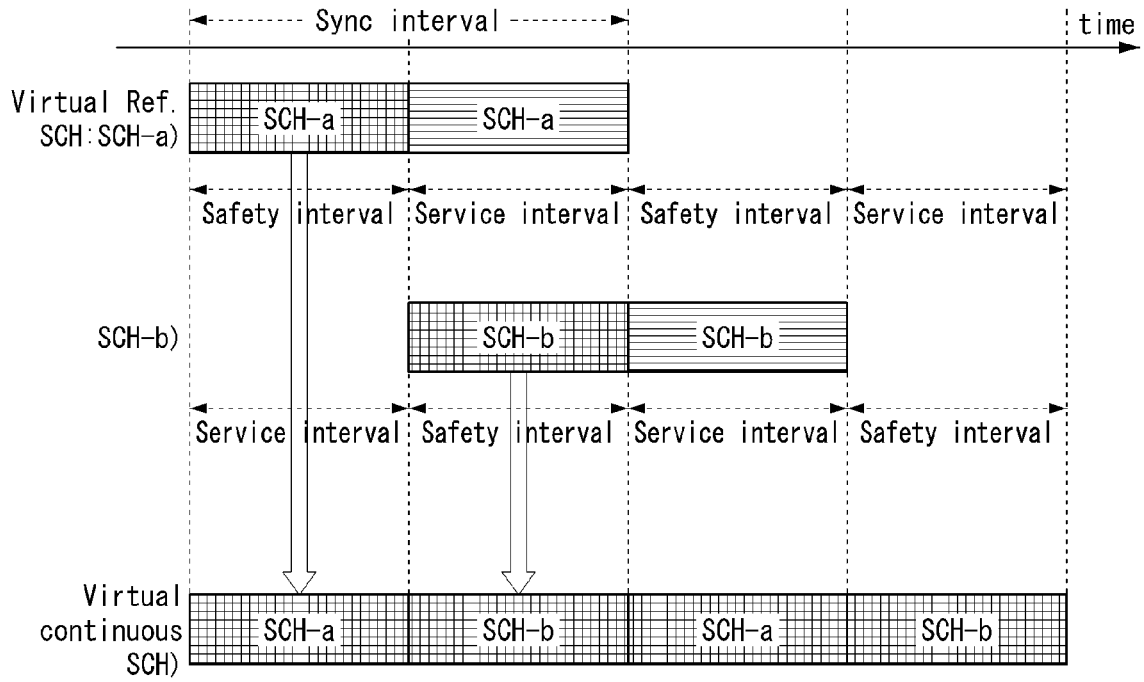
FIG. 7 illustrates an operation method of sequential CA according to an embodiment of the disclosure.

FIG. 7 illustrates an operation method of sequential CA according to an embodiment of the disclosure.

In the embodiment of FIG. 7, an SCH-a is assumed to be a virtual reference SCH. In the SCH-a and a SCH-b, the length of a sync interval, the length of a safety interval, and the length of a service interval may be the same, and the safety intervals of the respective SCHs may be configured to not overlap each other. The sync interval of the SCH-b may be delayed by the safety interval of the SCH-a. As a result, when an SCH transceiver sequentially accesses channels, it may perform communication in continuous SCH safety intervals.

From a safety message transmission and reception viewpoint, a sequential CA operation/operation may be performed as follows.

When an SCH transceiver is turned on, the SCH transceiver may set the synchronization of a basic safety interval and service interval through an SCH-a, that is, a virtual reference SCH. The SCH transceiver may receive a scanned SAM during the safety interval, and may obtain length information of a sync interval, safety interval information, and service interval information from the received SAM. When a system configuration for a sequential CA operation is set up, the SCH transceiver may transmit or receive a safety message during the safety interval of the SCH-a. If safety message communication is not sufficient or not reliable during the safety interval of the SCH-a, the SCH transceiver may sequentially move to a next SCH (SCH-b) and continue to perform safety message transmission and reception. The SCH transceiver can continuously perform communication as if it uses virtual continuous SCHs like a CCH by moving to an SCH using such a method and transmitting and receiving safety messages.

From a V2X service transmission and reception viewpoint, a sequential CA operation/operation may be performed as follows.

When an SCH transceiver is turned on, the SCH transceiver may set up a system configuration for a sequential CA operation as in the aforementioned safety message transmission and reception process. When the system for the sequential CA operation is set up, the SCH transceiver may transmit and receive SAMs in the safety interval of an SCH-a. If an interested V2X service is provided in the SCH-a, the SCH transceiver may transmit or receive services while staying in the SCH-a without a channel change. If an interested V2X service is not provided in the SCH-a, the SCH transceiver may change a channel to an SCH-b, and may transmit or receive an SAM in a safety interval. If the interested V2X service is provided in the SCH-b, the SCH transceiver may transmit and receive the corresponding service while staying in the SCH-b. If the interested V2X service is not provided in the SCH-b, the SCH transceiver may move to a next SCH and perform the aforementioned operation. The next SCH may be an SCH-c or the SCH-a depending on a system configuration for a CA operation.

Figure 8:
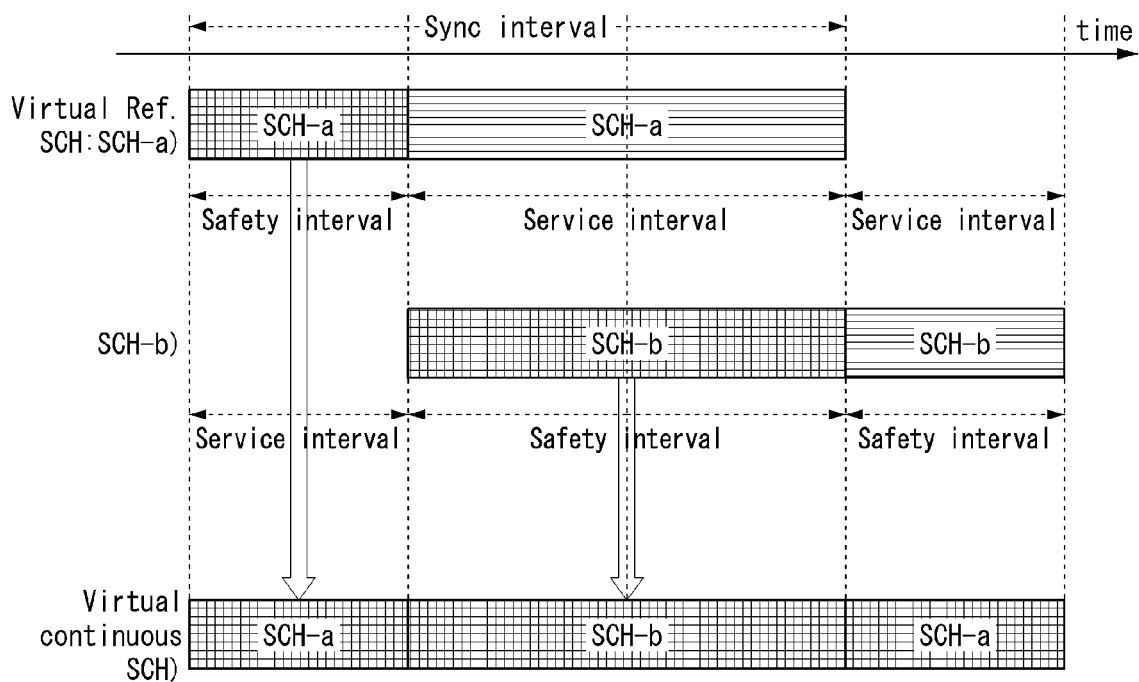
FIG. 8 illustrates an operation method of sequential CA according to another embodiment of the disclosure.

FIG. 8 illustrates an operation method of sequential CA according to another embodiment of the disclosure.

The embodiment of FIG. 8 illustrates a virtual continuous SCH configuration method of sequential CA using two channels. In the embodiment of FIG. 8, an SCH-a is assumed to be a virtual reference SCH. In the SCH-a and an SCH-b, the length of a sync interval is the same, but the length of a safety interval and the length of a service interval are differently configured. The safety intervals of the respective SCHs are configured to not overlap each other.

In the embodiment of FIG. 8, a sync interval includes a safety interval and a service interval. In this case, the length of the service interval of the SCH-a is configured to be longer than that of the safety interval thereof. The length of the safety interval of the SCH-b is configured to be longer than that of the service interval thereof. The sync interval of the SCH-b is more delayed than the sync interval of the SCH-a by the safety interval of the SCH-a. In the sequential CA method, the sync interval of a subsequent accessing SCH may be delayed by the length of the safety interval of a previous SCH.

In FIG. 8, an SCH transceiver may configure continuous safety intervals by sequentially accessing the SCH-a and the SCH-b, and may transmit or receive a safety message/SAM in the continuous safety intervals.

Figure 9:
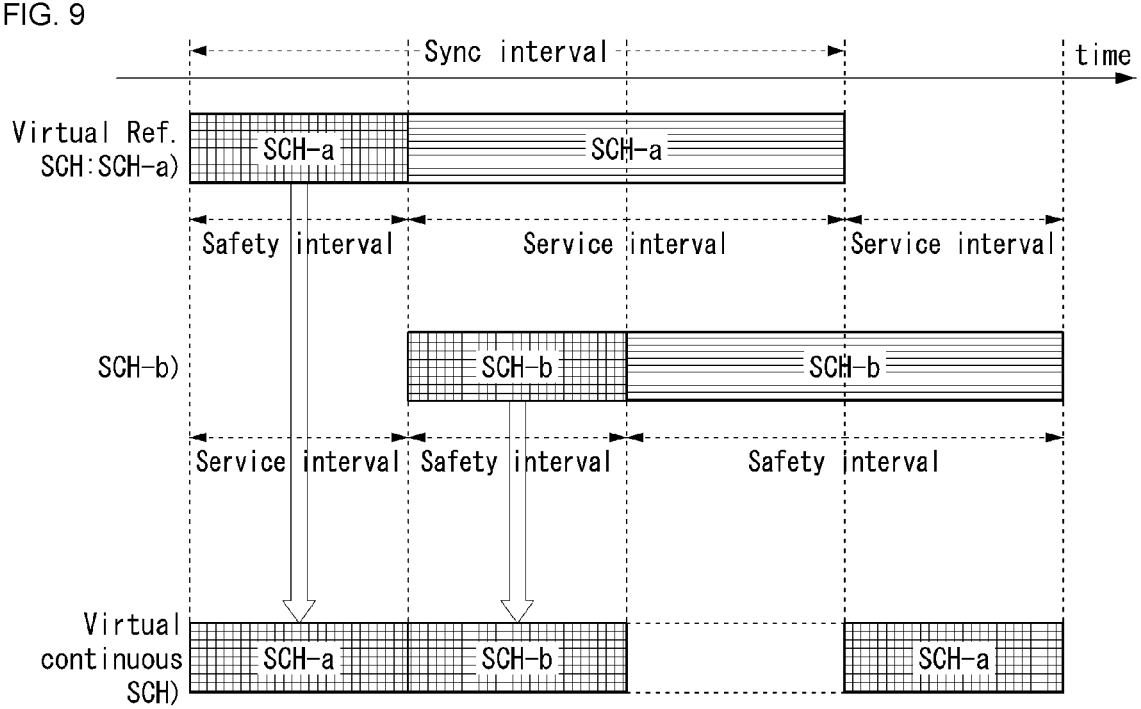
FIG. 9 illustrates an operation method of sequential CA according to another embodiment of the disclosure.

FIG. 9 illustrates an operation method of sequential CA according to another embodiment of the disclosure.

The embodiment of FIG. 9 illustrates a virtual reference SCH configuration method of sequential CA using two channels. In the embodiment of FIG. 9, an SCH-a is assumed to be a virtual reference SCH. In the SCH-a and an SCH-b, the length of a sync interval, the length of a safety interval and the length of a service interval are the same, and the safety intervals of the respective SCHs are configured to not overlap each other. In the sequential CA method, the sync interval of a subsequent accessing SCH may be delayed by the length of the safety interval of a previous SCH.

In the embodiment of FIG. 9, a sync interval includes a safety interval and a service interval. In this case, in the SCH-a and the SCH-b, the length of the service interval is configured to be longer than that of the safety interval. Accordingly, as in the embodiments of FIGS. 7 and 8, a virtual continuous SCH is not configured. In this case, a safety message can be provided more efficiently compared to the embodiment of FIG. 5. The length of the safety interval and the length of the service interval of each of the SCH-a and the SCH-b may be determined by a use case of each channel. The embodiment of FIG. 9 may be suitable for providing video-related V2X service if the amount of service content is much.

Figure 10:
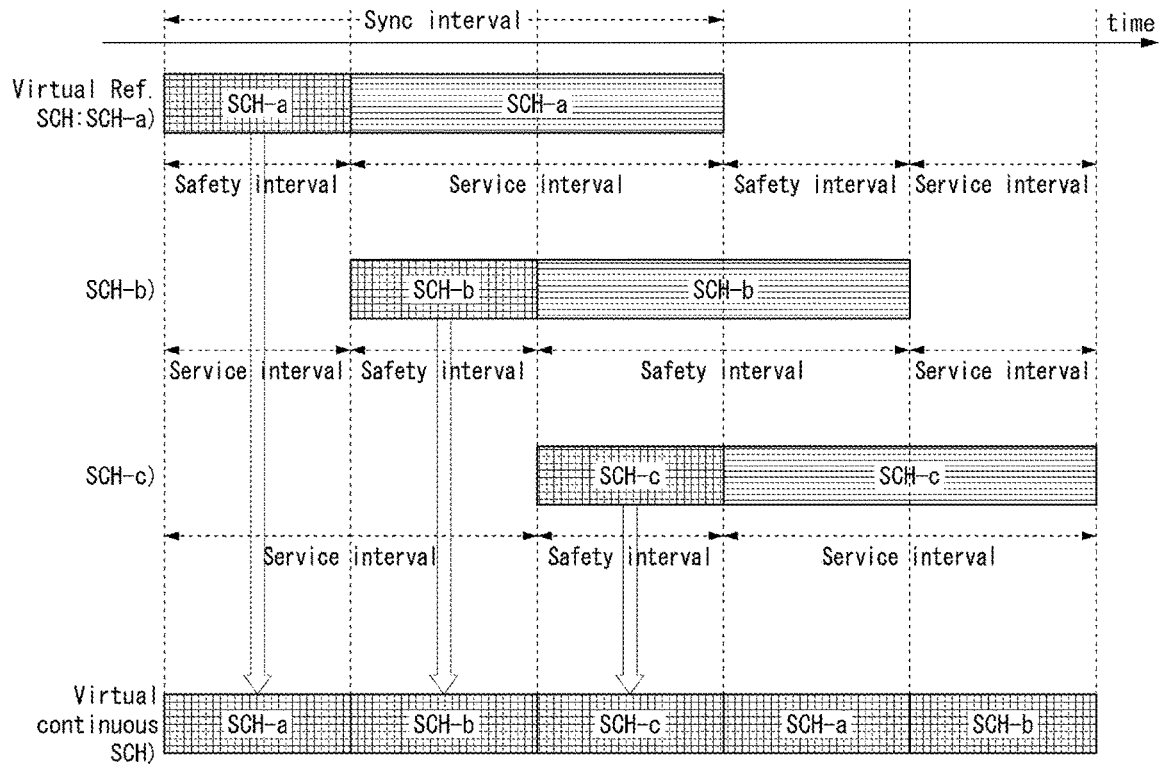
FIG. 10 illustrates an operation method of sequential CA according to another embodiment of the disclosure.

FIG. 10 illustrates an operation method of sequential CA according to another embodiment of the disclosure.

The embodiment of FIG. 10 illustrates a virtual reference SCH configuration method of sequential CA using three channels. In the embodiment of FIG. 10, an SCH-a is assumed to be a virtual reference SCH. In the SCH-a, an SCH-b and an SCH-c, the length of a sync interval, the length of a safety interval and the length of a service interval may be the same. The safety intervals of the respective SCHs are configured to not overlap each other. In the sequential CA mode, the sync interval of a subsequent accessing SCH may be delayed by the length of the safety interval of a previous SCH.

In the embodiment of FIG. 10, a sync interval includes a safety interval and a service interval. In this case, in the SCH-a, the SCH-b, and an SCH-c, the length of the service interval may be configured to be longer than that of the safety interval. The sync interval of the SCH-b is configured to be more delayed than the sync interval of the SCH-a by the safety interval of the SCH-a. The sync interval of the SCH-b is configured to be more delayed than the sync interval of the SCH-b by the safety interval of the SCH-b. That is, the sync interval of the SCH-b may be delayed by the sum of the safety interval of the SCH-a and the safety interval of the SCH-b. As a result, as illustrated on the lower side of FIG. 10, virtual continuous SCH safety intervals may be configured. In FIG. 10, an SCH transceiver may configure continuous safety intervals by sequentially accessing the SCH-a, the SCH-b, and the SCH-c, and may transmit or receive a safety message/SAM in the continuous safety intervals.

Figure 11:
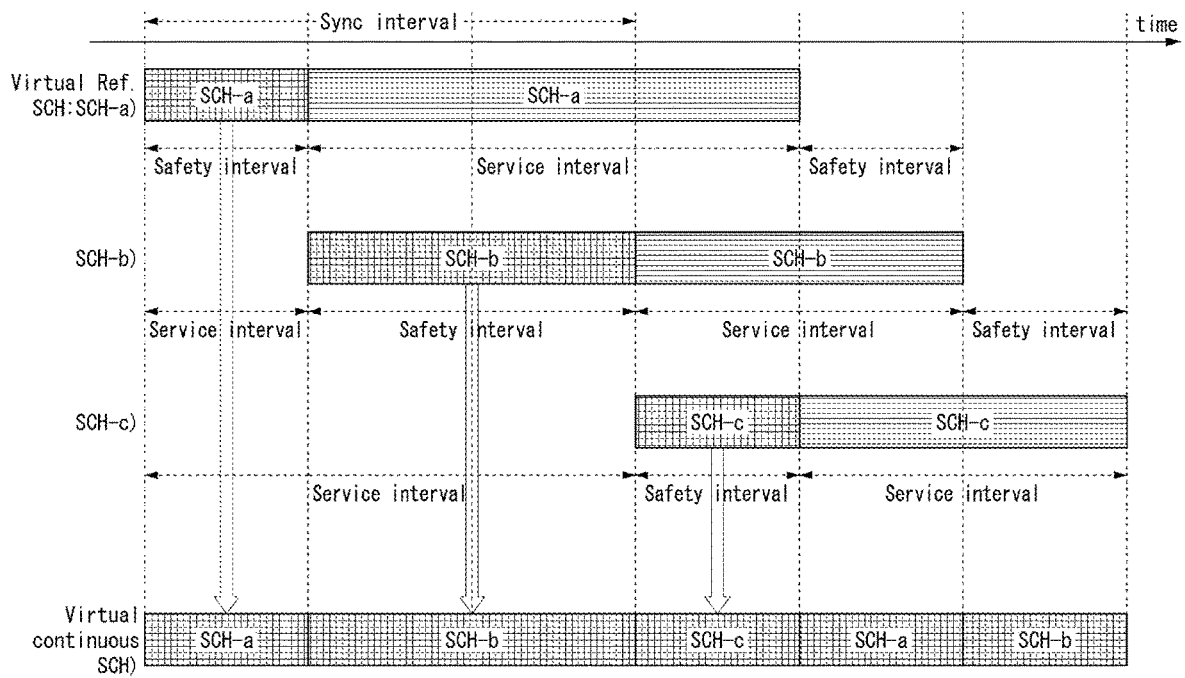
FIG. 11 illustrates an operation method of sequential CA according to another embodiment of the disclosure.

FIG. 11 illustrates an operation method of sequential CA according to another embodiment of the disclosure.

The embodiment of FIG. 11 illustrates a virtual reference SCH configuration method of sequential CA using three channels. In the embodiment of FIG. 11, an SCH-a is assumed to be a virtual reference SCH. In the SCH-a, an SCH-b, and an SCH-c, the length of a sync interval is the same, but the length of a safety interval and the length of a service interval are differently configured. The safety intervals of the respective SCHs are configured to not overlap each other. In the sequential CA method, the sync interval of a subsequent accessing SCH may be delayed by the length of the safety interval of a previous SCH.

In the embodiment of FIG. 11, a sync interval includes a safety interval and a service interval. In this case, in the SCH-a and the SCH-c, the length of the service interval is configured to be longer than that of the safety interval. In the SCH-b, the lengths of the service interval and the safety interval are configured to be the same.

The sync interval of the SCH-b is configured to be more delayed than the sync interval of the SCH-a by the safety interval of the SCH-a. The sync interval of the SCH-b is configured to be more delayed than the sync interval of the SCH-b by the safety interval of the SCH-b. That is, the sync interval of the SCH-b may be delayed by the sum of the safety interval of the SCH-a and the safety interval of the SCH-b. As a result, as illustrated on the lower side of FIG. 11, virtual continuous SCH safety intervals may be configured. In FIG. 11, an SCH transceiver may configure continuous safety intervals by sequentially accessing the SCH-a, the SCH-b, and the SCH-c, and may transmit or receive a safety message/SAM in the continuous safety intervals.

Figure 12:
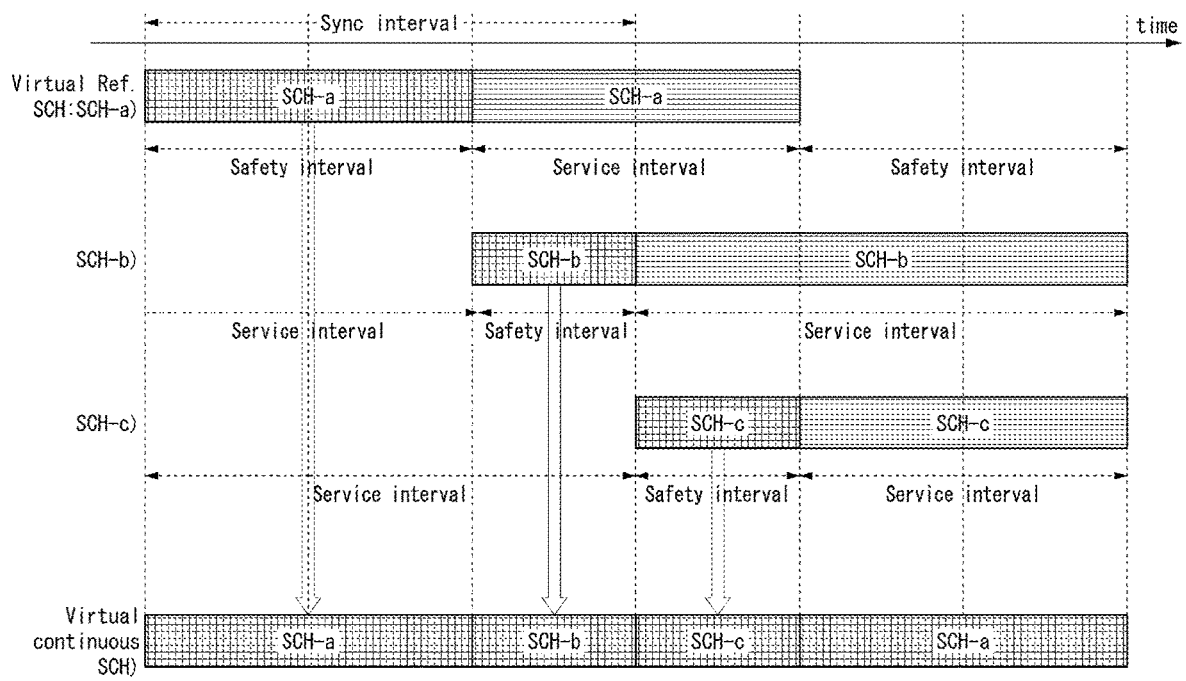
FIG. 12 illustrates an operation method of the sequential CA according to another embodiment of the disclosure.

FIG. 12 illustrates an operation method of sequential CA according to another embodiment of the disclosure.

The embodiment of FIG. 12 illustrates a virtual reference SCH configuration method of sequential CA using three channels. In the embodiment of FIG. 12, an SCH-a is assumed to be a virtual reference SCH. In the SCH-a, an SCH-b, and an SCH-c, the length of a sync interval is the same, but the length of a safety interval and the length of a service interval are differently configured. The safety intervals of the respective SCHs are configured to not overlap each other. In the sequential CA method, the sync interval of a subsequent accessing SCH may be delayed by the length of the safety interval of a previous SCH.

In the embodiment of FIG. 12, a sync interval includes a safety interval and a service interval. In this case, in the SCH-b and the SCH-c, the length of the service interval is configured to be longer than that of the safety interval. In the SCH-a, the lengths of the service interval and the safety interval are configured to be the same.

The sync interval of the SCH-b is configured to be more delayed than the sync interval of the SCH-a by the safety interval of the SCH-a. The sync interval of the SCH-b is configured to be more delayed than the sync interval of the SCH-b by the safety interval of the SCH-b. That is, the sync interval of the SCH-b may be delayed by the sum of the safety interval of the SCH-a and the safety interval of the SCH-b. As a result, as illustrated on the lower side of FIG. 12, virtual continuous SCH safety intervals may be configured. In FIG. 12, an SCH transceiver may configures continuous safety intervals by sequentially accessing the SCH-a, the SCH-b, and the SCH-c, and may transmit or receive a safety message/SAM in the continuous safety intervals.

Hereinafter, a mixed CA method using the base CA method of FIG. 5 and the aforementioned sequential CA method together is described.

In the mixed CA method, the V2X communication apparatus may transmit or receive a safety message in a CCH using a CCH transceiver. The V2X communication apparatus may transmit or receive a safety message/SAM and V2X communication service using an SCH transceiver. In this case, the V2X communication apparatus may perform SCH communication based on a channel band.

Figure 13:
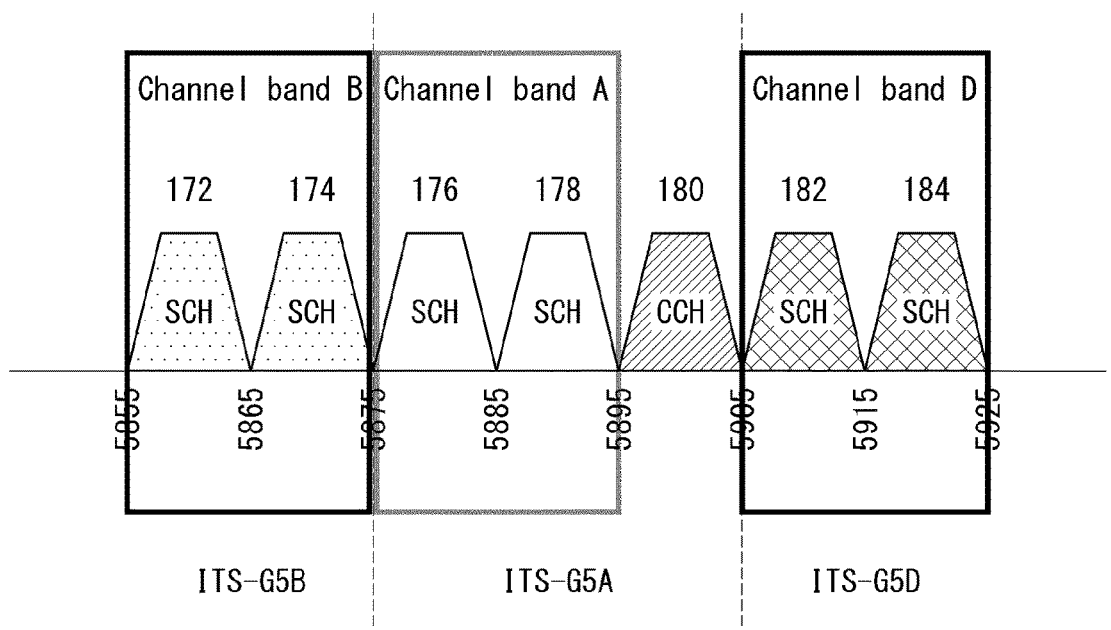
FIG. 13 illustrates a channel band configuration for a mixed CA mode according to an embodiment of the disclosure.

FIG. 13 illustrates a channel band configuration for a mixed CA mode according to an embodiment of the disclosure.

A channel band includes a plurality of SCHs. In the embodiment of FIG. 13, each of a channel band A, a channel band B, and a channel band D includes two SCHs, but one channel band may include three or more SCHs. The V2X communication apparatus may transmit or receive a safety message and V2X service within a channel band using an SCH transceiver.

The base CA method may be applied within the channel band. That is, the SCH transceiver may perform communication using a TDM method in a safety interval and service interval within each channel band. Each channel band may include a reference SCH and an SCH-x. The SCH-x indicates the remaining SCH other than the reference SCH in a channel in which the use of V2X service within each channel band is permitted.

The aforementioned sequential CA method may be applied between channel bands. All of available channels may include a virtual reference channel band and an SCH band-a/b/c. The sync interval of a channel band may be relatively delayed so that the reference SCH safety intervals of respective channel bands do not overlap.

When the SCH transceiver is turned on, the SCH transceiver accesses a virtual reference channel band. The virtual reference channel band is a default channel band in which the SCH transceiver is basically positioned. In an embodiment, an ITS-G5A channel band may be a virtual reference channel band. Synchronization between a basic safety interval and a service interval may be performed in the virtual reference channel band. Compared to the aforementioned reference SCH, the virtual reference channel band is a virtual channel band for performing basic synchronization-related setup necessary for a CA operation. The virtual reference channel band may be randomly designated, and a virtual reference channel band may not be configured according to circumstances.

The aforementioned base CA method may be applied within each channel band. Furthermore, the sequential CA method may be applied between channel bands. One reference SCH may be present within each channel band. If multiple channel bands operate, two or more reference SCHs may be present. Safety intervals may be configured to not overlap each other between channel bands because the safety interval of the reference SCH of each channel band is relatively delayed. The lengths of sync intervals defined for respective channel bands may be the same. A safety message may be transmitted in the reference SCH safety interval of each channel band. Furthermore, the V2X apparatus may transmit a safety message in the safety interval of the reference SCH of each channel band while contiguously moving to a channel band like a CCH.

An SAM transmitted in the safety interval of the reference SCH of each channel band may include V2X service information provided in the corresponding channel band. From the viewpoint of a V2X service provider, an SAM transmitted during the safety interval of each SCH may include only V2X service information provided in a corresponding channel band. From the viewpoint of a V2X service user, if an SAM received during the safety interval of each SCH notifies that an interested V2X service is provided in a corresponding channel band, the V2X apparatus may receive the corresponding service without moving to a channel band. From a V2X service user viewpoint, if it is known that an interested service is not present based on an SAM received in the safety interval of a corresponding channel band, the V2X apparatus may access a next channel band whose contiguous movement has been reserved, and may confirm services provided in the channel band by receiving an SAM in the safety interval of the accessed SCH.

The embodiment of FIG. 13 can increase a channel use capacity by allowing V2X service transmission and reception in the SCH of another channel band during the safety interval of an SCH of each channel band unlike in the base CA mode. There can be provided an effect in that a safety message is transmitted in one continuous virtual channel as in a CCH because the safety message is transmitted using the safety interval of a continuous SCH. An SCH transceiver may transmit or receive a safety message and SAM information in each channel band by sequentially changing a channel band starting from a given channel band.

A reference SCH is a default channel accessed by an SCH transceiver within each channel band. The SCH transceiver may first access the reference SCH when it is tuned to a specific channel band. Synchronization between a sync interval and a service interval within each channel band may be performed in the reference SCH. A safety message and an SAM may be provided through the reference SCH among SCHs within the channel band. In an embodiment, the transmission of a safety message and an SAM is permitted during a safety interval, but the transmission of a safety message and an SAM may not be permitted during a service interval. The SAM may provide information on both services provided in a reference SCH and services provided through an SCH-x within a channel band. The SCH transceiver may access the reference SCH and transmit or receive the safety message during the safety interval. The SCH transceiver may access the reference SCH and transmit or receive an SAM during the safety interval, and may move to the reference SCH or the SCH-x and transmit or receive V2X service during the service interval.

Within each channel band, an SCH-X is a channel in which V2X service is provided, and the transmission and reception of a safety message in the SCH-x may not be permitted. The SCH-transceiver may access a reference SCH and transmit or receive a safety message and SAM message during a safety interval. In an embodiment, the SCH-transceiver may maintain an idle state in a safety interval. The SCH transceiver may access a corresponding SCH within a channel band in a service interval and transmit or receive services during a safety interval in order to use an interested V2X service among services indicated by received SAM information.

Figure 14:
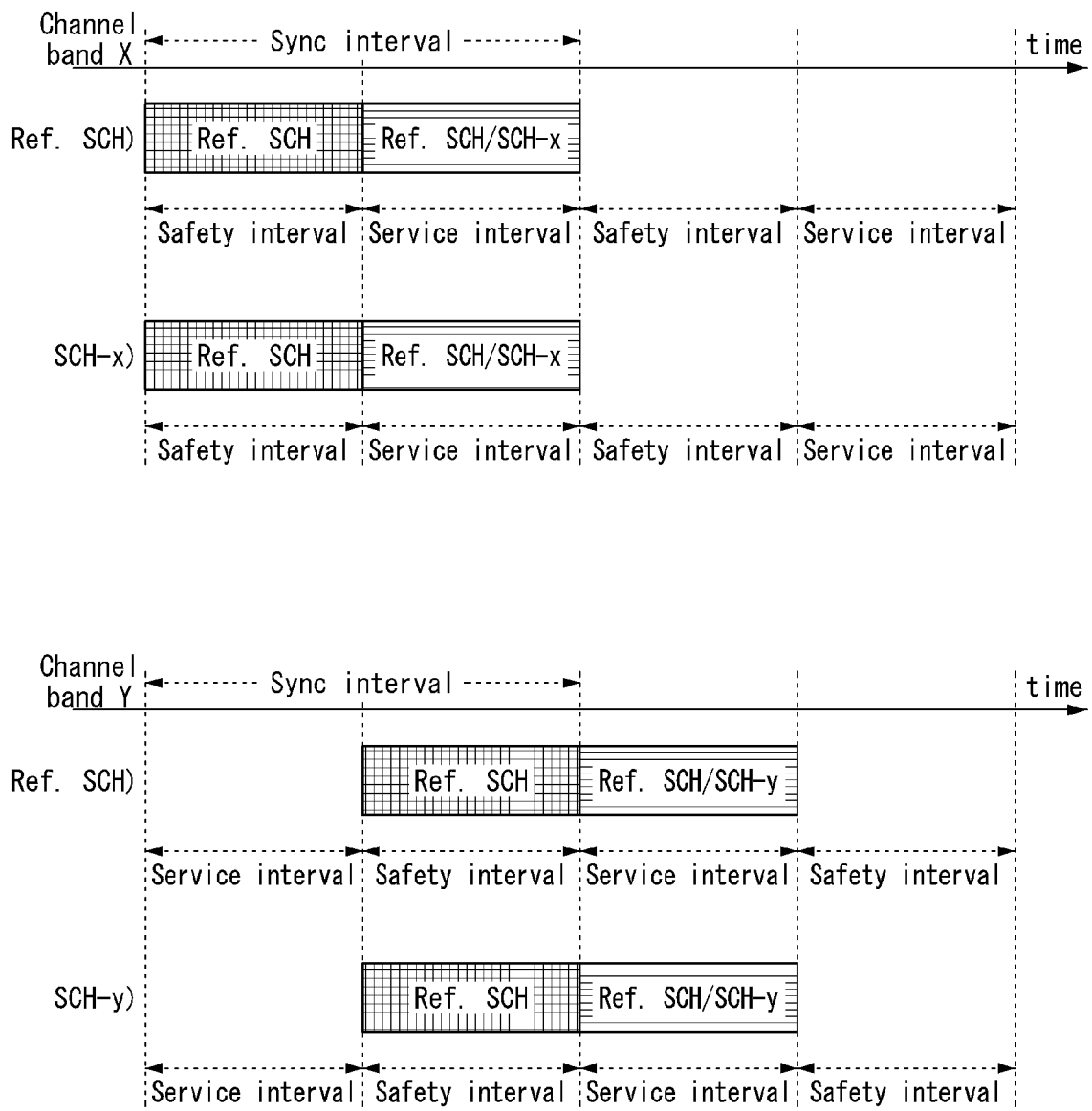
FIG. 14 illustrates a mixed CA operation method according to an embodiment of the disclosure.

FIG. 14 illustrates a mixed CA operation method according to an embodiment of the disclosure.

In the embodiment of FIG. 14, as described above, the CA method described with reference to FIG. 5 may be applied within a channel band, and the sequential CA method described with reference to FIGS. 6 to 12 may be applied between channel bands.

In FIG. 14, a channel band-X is assumed to be a virtual reference channel. In the channel band-X and a channel band-Y, each of the lengths of sync intervals, the lengths of safety intervals, and the lengths of service intervals is the same, and the safety intervals of reference SCHs of the respective channel bands do not overlap each other. The sync interval of the channel band-Y is delay by the safety interval of the channel band-X. From FIG. 14, it may be seen that an SCH transceiver provides virtual continuous SCHs and continuous safety intervals in a CCH by transmitting and receiving safety messages while sequentially tuning the channel band-X and the channel band-Y.

Figure 15:
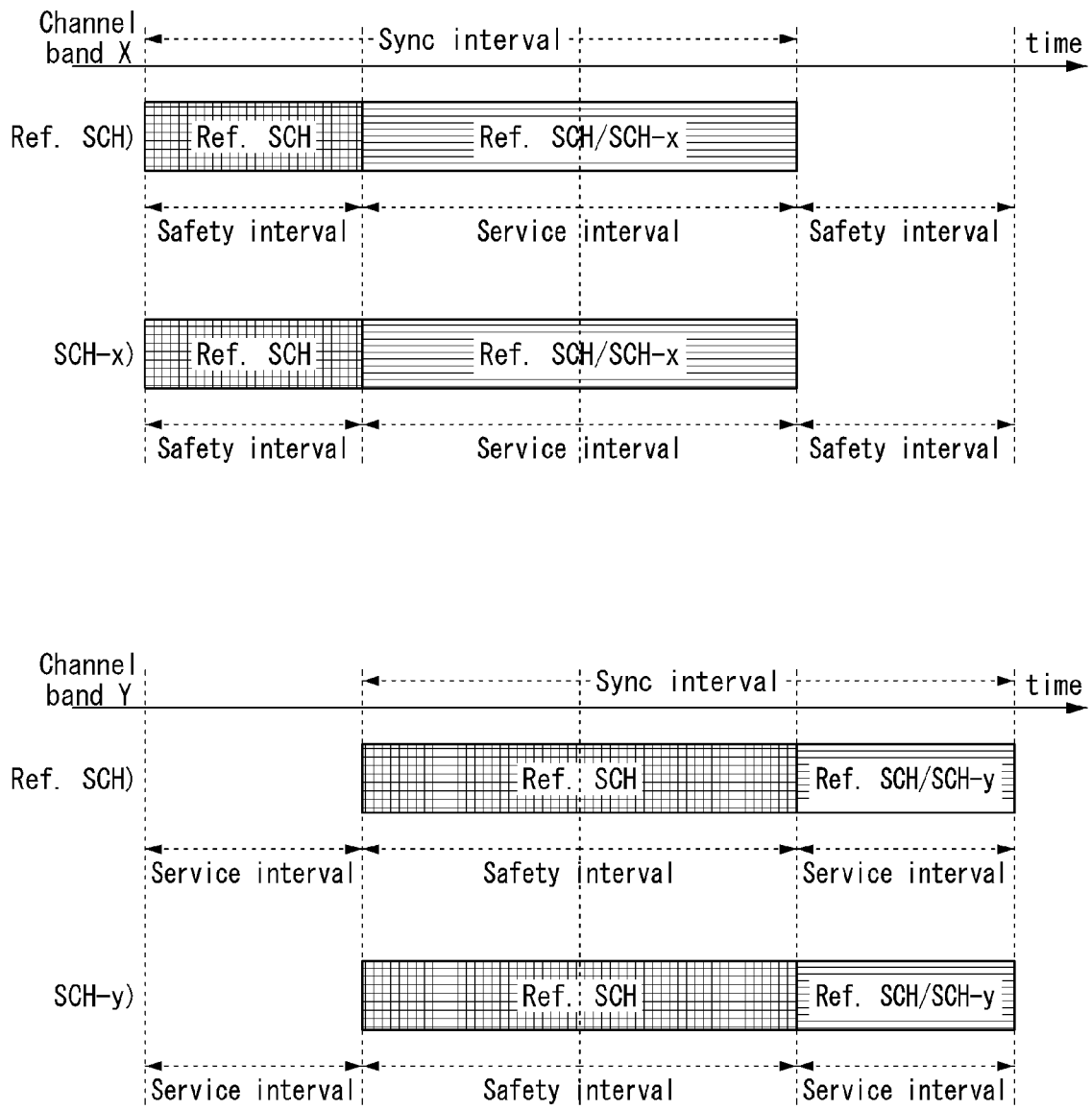
FIG. 15 illustrates a mixed CA operation method according to another embodiment of the disclosure.

FIG. 15 illustrates a mixed CA operation method according to another embodiment of the disclosure.

In the embodiment of FIG. 15, as described above, the CA method described with reference to FIG. 5 may be applied within the channel band, and the sequential CA method described with reference to FIGS. 6 to 12 may be applied between channel bands.

In FIG. 15, a channel band-X is assumed to be a virtual reference channel. The lengths of sync intervals of the channel band-X and a channel band-Y are the same, but each of the lengths of safety intervals and the lengths of service intervals thereof is not the same. The safety intervals of the reference SCHs of respective channel bands do not overlap. The sync interval of the channel band-Y is delayed by the safety interval of the channel band-X. From FIG. 15, it may be seen that an SCH transceiver provides virtual continuous SCHs and continuous safety intervals as in a CCH by transmitting and receiving safety messages while sequentially turning the channel band-X and the channel band-Y.

In the embodiment of FIG. 15, a sync interval includes a safety interval and a service interval. In this case, in the channel band-X, the length of the service interval is configured to be longer than that of the safety interval. In the channel band-Y, the length of the safety interval is configured to be longer than that of the service interval. The sync interval of the channel band-Y is configured to be more delayed than the sync interval of the channel band-X by the safety interval of the channel band-X. In the mixed CA method, the sync interval of a subsequent accessing channel band may be delayed by the length of the safety interval of a previous accessing channel band.

Figure 16:
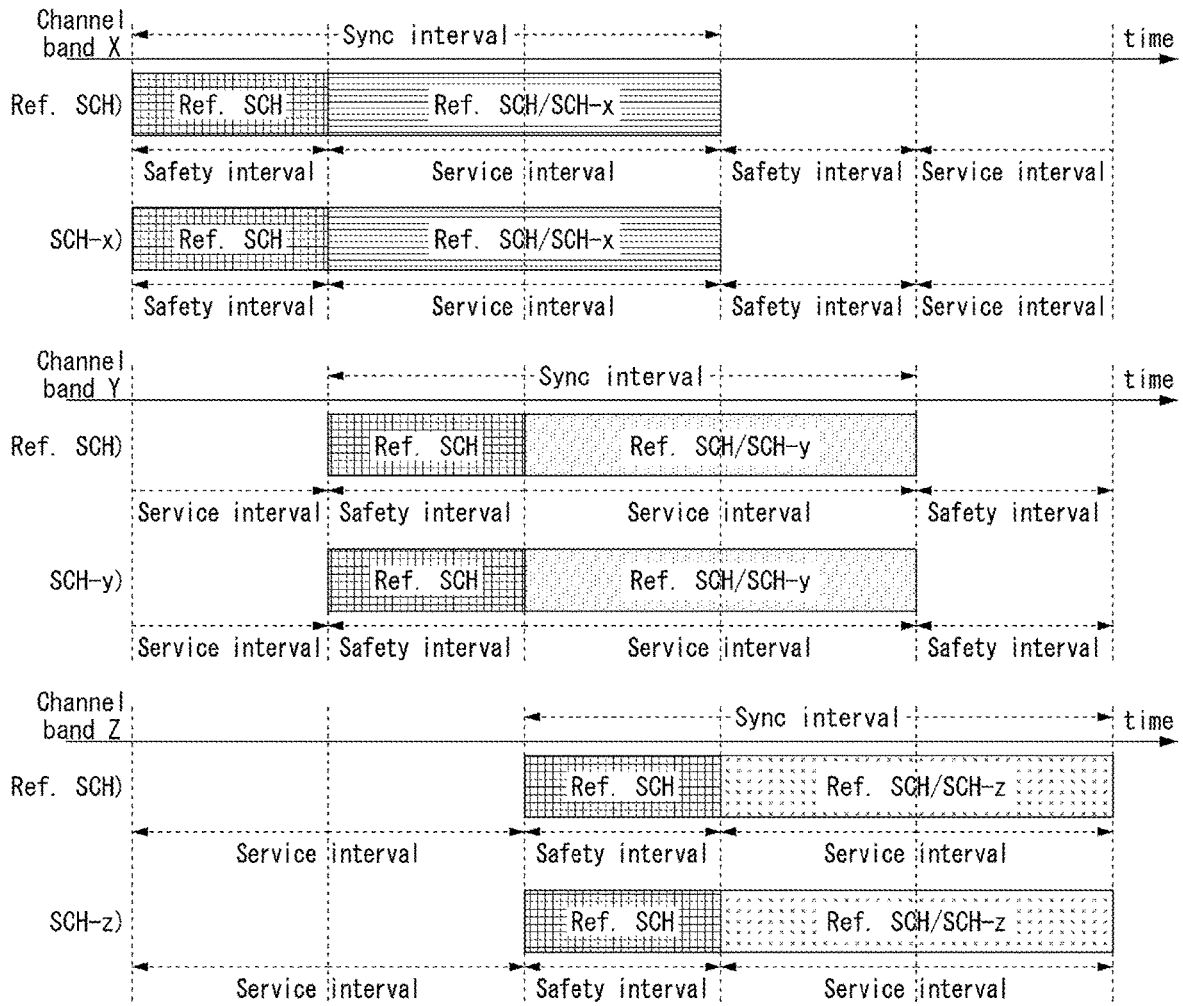
FIG. 16 illustrates a mixed CA operation method according to another embodiment of the disclosure.

FIG. 16 illustrates a mixed CA operation method according to another embodiment of the disclosure.

In the embodiment of FIG. 16, as described above, the CA method described with reference to FIG. 5 may be applied within the channel band, and the sequential CA method described with reference to FIGS. 6 to 12 may be applied between channel bands.

In FIG. 16, a channel band-X is assumed to be a virtual reference channel. In the channel band-X, a channel band-Y, and a channel band-Z, each of the lengths of sync intervals, the lengths of safety intervals, and the lengths of service intervals is the same, and the safety intervals of reference SCHs of respective channel bands do not overlap. The sync interval of the channel band-Y is delayed by the safety interval of the channel band-X. From FIG. 16, it may be seen that an SCH transceiver provides virtual continuous SCHs and continuous safety intervals as in a CCH by transmitting and receiving safety messages while sequentially tuning the channel band-X and the channel band-Y.

In the embodiment of FIG. 16, a sync interval includes a safety interval and a service interval. In this case, in the channel band-X, the channel band-Y, and the channel band-Z, the length of the service interval may be configured to be longer than that of the safety interval. The sync interval of the channel band-Y is configured to be more delayed than the sync interval of the channel band-X by the safety interval of the channel band-X. The sync interval of the channel band-Z is configured to be more delayed than the sync interval of the channel band-Y by the safety interval of the channel band-Y. That is, the sync interval of the channel band-Z may be delayed by the sum of the safety interval of the channel band-X and the safety interval of the channel band-Y. As a result, as in FIG. 7, virtual continuous SCH safety intervals may be configured.

Figure 17:
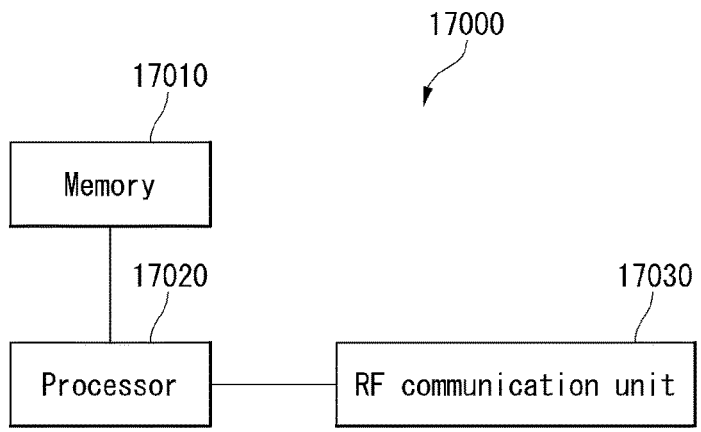
FIG. 17 illustrates a V2X communication apparatus according to an embodiment of the disclosure.

FIG. 17 illustrates a V2X communication apparatus according to an embodiment of the disclosure.

In FIG. 17, the V2X communication apparatus 17000 may include a memory 17010, a processor 17020, and a communication unit 17030. As described above, the V2X communication apparatus may correspond to an on board unit (OBU) or a roadside unit (RSU) or may be included in an OBU or an RSU. The V2X communication apparatus may be included in an ITS station or may correspond to an ITS station.

The communication unit 17030 is connected to the processor 17020 and may transmit or receive a radio signal. The communication unit 17030 may up-convert data, received from the processor 17020, into a transmission and reception band, and may transmit the data. The communication unit may down-convert a received signal, and may transmit the signal to the processor. The communication unit may implement an operation of an access layer. In an embodiment, the communication unit may implement an operation of a physical layer included in the access layer or may additionally implement an operation of a MAC layer. The communication unit may include a plurality of sub-communication units in order to perform communication according to a plurality of communication protocols. In an embodiment, the communication unit may perform communication based on various wireless local area network (WLAN) communication protocols and cellular communication protocols, such as 802.11, wireless access in vehicular environments (WAVE), dedicated short range communications (DSRC), and 4G long-term evolution (LTE).

The processor 17020 is connected to the communication unit 17030 and may implement operations of layers according to an ITS system or a WAVE system. The processor 17020 may be configured to perform operations according to various embodiments of the disclosure based on the aforementioned drawings and description. Furthermore, at least one of a module, data, a program or software that implements operations of the V2X communication apparatus 17000 according to aforementioned various embodiments of the disclosure may be stored in the memory 17010 and executed by the processor 17020.

The memory 17010 is connected to the processor 17020, and stores various pieces of information for driving the processor 17020. The memory 17010 may be included within the processor 17020 or installed outside the processor 17020, and may be connected to the processor 17020 by known means. The memory may include a security/non-security storage or may be included in a security/non-security storage. According to an embodiment, the memory may be referred to as a security/non-security storage.

A detailed configuration of the V2X communication apparatus 17000 of FIG. 17 may be implemented so that the aforementioned various embodiments of the disclosure are independently applied to the detailed configuration or two or more of the embodiments are applied to the detailed configuration together.

Particularly, in an embodiment of the disclosure, the communication unit includes a CCH transceiver that performs communication in a CCH and an SCH transceiver that performs communication in an SCH.

Figure 18:
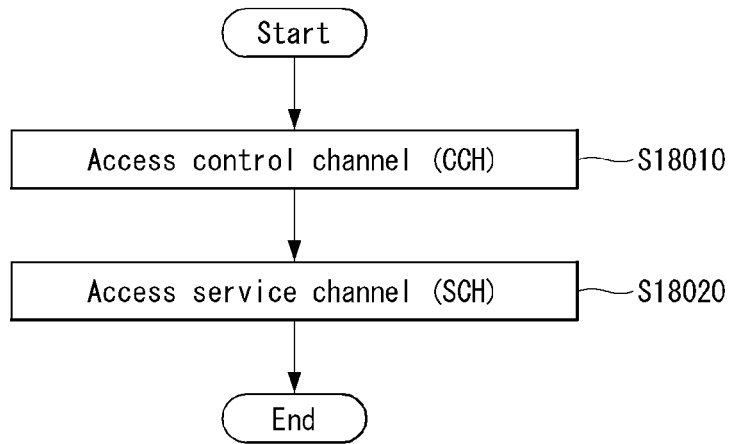
FIG. 18 is a flowchart illustrating a communication method of the V2X communication apparatus according to an embodiment of the disclosure.

FIG. 18 is a flowchart illustrating a communication method of the V2X communication apparatus according to an embodiment of the disclosure.

The V2X communication apparatus accesses a control channel (S18010). The V2X communication apparatus may access a CCH using the CCH transceiver. The V2X communication apparatus may transmit or receive a safety message, a CAM, etc. in the CCH.

The V2X communication apparatus accesses a service channel (S18020). The V2X communication apparatus may access an SCH using the SCH transceiver. The SCH access operation of the SCH transceiver is described later with reference to FIGS. 19 and 20.

In the flowchart of FIG. 18, the control channel access and the service channel access have been sequentially illustrated. In this case, in the disclosure, the CCH transceiver and SCH transceiver of the communication unit may operate at the same time to perform communication in a plurality of FDMed bands at the same time. That is, in the disclosure, communication in a control channel and communication in a service channel are separately performed, and are not restricted to the sequence of FIG. 18. The V2X communication apparatus accesses an SCH and performs communication using the SCH transceiver.

Figure 19:
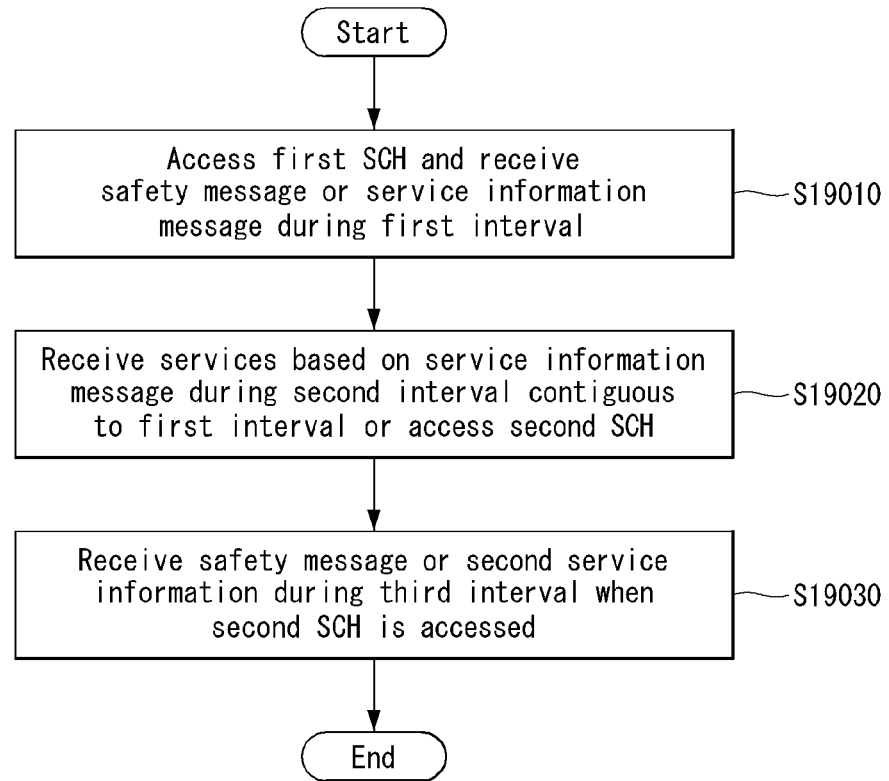
FIG. 19 illustrates an SCH communication method of the V2X communication apparatus according to an embodiment of the disclosure.

FIG. 19 illustrates an SCH communication method of the V2X communication apparatus according to an embodiment of the disclosure.

FIG. 19 illustrates the SCH access step of FIG. 18 more specifically. The sequential CA operation described in FIGS. 6 to 12 is applied to FIG. 19.

The V2X communication apparatus may access a first SCH, and may receive a safety message or service information message during a first interval (S19010). The safety message indicates a message related to vehicle driving safety. At least one of a CAM or a DANM may be included in the safety message. The service information message may indicate an available service and communication access technology information for obtaining the corresponding service as described above. For example, the service information message may include a channel (channel number) in which a specific service is provided, a transmission power level, and a data rate. The service information message received in the first SCH may include information on services provided in the first SCH.

The V2X communication apparatus may transmit or receive services based on the service information message during a second interval contiguous to the first interval or may access a second SCH (S19020). In an embodiment, the first interval and the second interval may configure a sync interval.

When the V2X communication apparatus accesses the second SCH, it may receive a safety message or service information message during a third interval (S19030). The service information message received in the second SCH may include information on services provided in the second SCH.

The access to the first SCH and the access to the second SCH may be synchronized. That is, communications for the first SCH and the second SCH may operate based on the same sync interval. In the sequential CA mode, the sync interval of a subsequent accessing SCH is delayed by the length of a safety interval of a previous accessing SCH. In the embodiment of FIG. 19, the sync interval of the second SCH is more delayed than the sync interval of the first SCH by the first interval. Accordingly, start timing of the third interval may be contiguous to end timing of the first interval.

CCH access and the SCH access are performed based on the same sync interval. A sync interval for the first SCH may include a first interval and a second interval. A sync interval for the second SCH may include the third interval and a fourth interval. The first interval and the second interval may correspond to a safety interval and service interval for the first SCH. The third interval and the fourth interval may correspond to a safety interval and service interval for the second SCH.

If the sequential CA operates in two SCHs, the V2X communication apparatus may receive services in a second SCH based on the service information message of the second SCH or access a first SCH during a fourth interval.

If the sequential CA operate in three SCHs, the V2X communication apparatus may receive services in a second SCH based on the service information message of the second SCH or access a third SCH during a fourth interval. If the V2X communication apparatus accesses the third SCH, the V2X communication apparatus may receive a safety message or third service information message during a fifth interval. As described above, the first SCH access, the second SCH access, and the third SCH access are synchronized. Start timing of the third interval may be contiguous to end timing of the first interval, and start timing of the fifth interval may be contiguous to end timing of the third interval.

Figure 20:
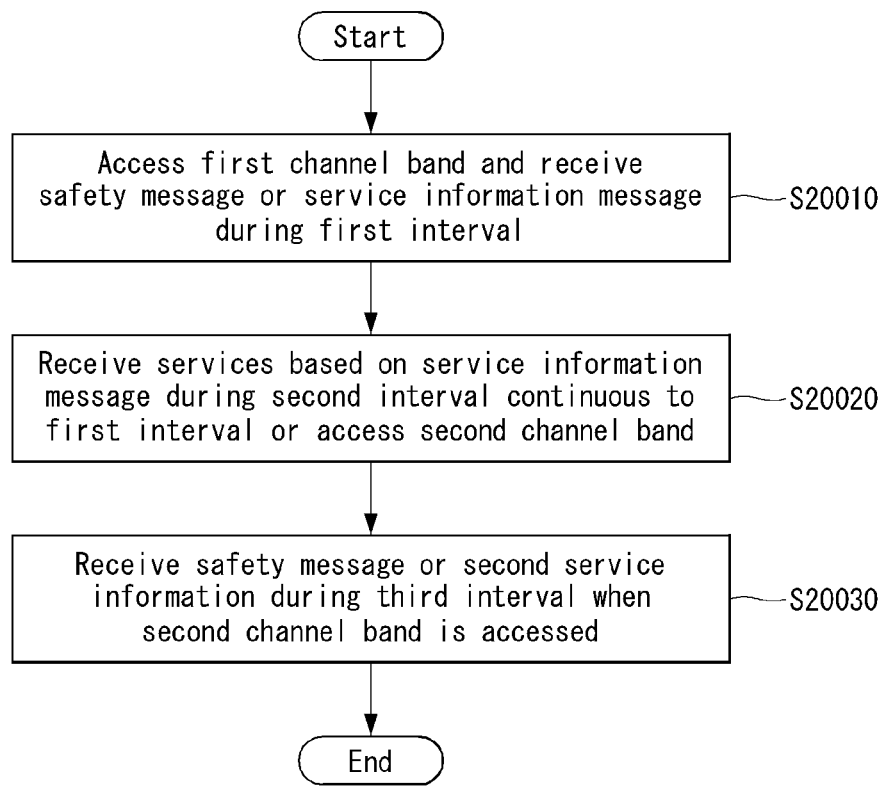
FIG. 20 illustrates an SCH communication method of the V2X communication apparatus according to another embodiment of the disclosure.

FIG. 20 illustrates an SCH communication method of the V2X communication apparatus according to another embodiment of the disclosure.

FIG. 20 illustrates the SCH access step of FIG. 18 more specifically. The mixed CA operation described in FIGS. 13 to 16 is applied to FIG. 20.

The V2X communication apparatus may access a first channel band, and may receive a safety message or service information message during a first interval (S20010). The safety message indicates a message related to vehicle driving safety. At least one of a CAM or a DANM may be included in the safety message. The service information message may indicate an available service and communication access technology information for obtaining the corresponding service as described above. For example, the service information message may include a channel (channel number) in which a specific service is provided, a transmission lower level, and a data rate. The service information message received in the first channel band may include information on services provided in the first channel band.

The V2X communication apparatus may transmit or receive services based on the service information message during a second interval continuous to the first interval or may access a second channel band (S20020). In an embodiment, the first interval and the second interval may configure a sync interval.

When the V2X communication apparatus accesses a second channel band, it may receive a safety message or service information message during a third interval (S20030). The service information message received in the second channel band may include information on services provided in the second channel band.

The access to the first channel band and the access to the second channel band may be synchronized. That is, communications for the first channel band and the second channel band may operate based on the same sync interval. In the sequential CA mode, the sync interval of a subsequent accessing channel band is delayed by the length of a safety interval of a previous accessing channel band. In the embodiment of FIG. 20, the sync interval of the second channel band is more delayed than the sync interval of the first channel band by the first interval. Accordingly, start timing of the third interval may be contiguous to end timing of the first interval.

The CCH access and the SCH access are performed based on the same sync interval. The sync interval for the first channel band includes the first interval and the second interval. The sync interval for the second channel band may include the third interval and a fourth interval. The first interval and the second interval may correspond to the safety interval and service interval for the first channel band. The third interval and the fourth interval may correspond to the safety interval and service interval for the second channel band.

Each channel band includes a plurality of SCHs. The base CA mode may be applied between SCHs within the channel band. The sequential CA mode may be applied between the channel bands.

In the case of the aforementioned base CA mode, a CA operation can be easily implemented because the base CA mode has a simple operation. In the base CA mode, a safety message may be additionally provided through the safety interval of a reference SCH. If V2X service is provided, a hidden node problem between vehicles can be solved by propagating an SAM message in a safety interval.

In this case, channel use efficiency may be reduced because the use of an SCH-x channel is impossible during the safety interval of a reference channel. If the number of multiple channels is many, a channel starvation phenomenon may occur within a safety interval. The channel starvation phenomenon may be solved by adjusting the length of the safety interval, but SCH use efficiency is reduced according to an increase in the safety interval. If a V2X service length is longer than a service interval, seamless V2X service provision may be limited. The seamless V2X service may be solved by adjusting a service interval length, but safety message delivery stability may be reduced because the distance between safety intervals is increased. Accordingly, the base CA mode may be used more effectively if the number of multiple channels is small.

In the case of the sequential CA mode, a fixed reference safety interval operation, such as the base CA mode, is not necessary because the safety intervals of respective SCHs are disposed to not overlap each other. The sequential CA mode has excellent channel use efficiency compared to the base mode because an SCH-x can be used during the safety intervals of respective SCHs. In the sequential CA mode, the V2X apparatus can continuously transmit a safety message while sequentially moving to the safety interval of an SCH. Virtual continuous SCHs can operate, and robustness to channel fading according to a sequential channel change can be provided. The V2X communication apparatus can obtain V2X service information by receiving an SAM in each SCH because the safety intervals of respective SCHs do not overlap. A channel starvation problem can be minimized by providing only information for service, provided in each SCH, in a corresponding channel compared to the base mode in which a channel starvation problem may occur because SAMs for all SCH-xs are transmitted in one reference SCH.

In this case, in the case of the sequential CA mode, a channel scan time for confirming V2X service provided in each SCH may be increased as the number of multiple channels increases. The reception of a safety message may be unstable if synchronization is not performed between a safety message provision vehicle and reception vehicle. For example, if a transmission SCH transceiver provides a safety message during a safety interval, a reception SCH transceiver may not receive the safety message if it stays in another channel. In this case, such a problem can be solved using a reference safety interval.

In the case of the mixed CA mode, a channel starvation phenomenon can be minimized because the base CA mode is applied to only SCHs within a channel band. Furthermore, a problem in that a safety message cannot be received if transmission and reception vehicles are not synchronized as in the sequential CA can be minimized. The mixed CA mode provides advantages according to a reference SCH safety interval operation. A fixed reference safety interval operation, such as the base CA mode, is not necessary because safety intervals of respective channel bands are disposed to not overlap each other. V2X service information provided in a channel band can be obtained through SAM reception during a reference SCH safety interval in each channel band. A channel starvation problem can be minimized by transmitting SAMs for all the SCHs of a channel band in one reference SCH. The V2X communication apparatus can transmit a safety message while sequentially moving to a reference SCH safety interval of a channel band. Accordingly, a virtual continuous SCH operation is possible, and robustness to channel fading according to a sequential channel change can be provided.

In this case, channel use efficiency may be reduced because a redundantly operating channel may occur compared to the sequential CA In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative from all aspects, but should be construed as being illustrative. The scope of the disclosure should be determined by reasonable analysis of the attached claims, and all changes within the equivalent range of the disclosure are included in the scope of the disclosure.

Mode for Invention

Those skilled in the art will understand that the disclosure may be changed and modified in various ways without departing from the spirit or scope of the disclosure. Accordingly, the disclosure is intended to include changes and modifications of the disclosure provided in the attached claims and an equivalent range thereof.

In this disclosure, both the apparatus and method inventions have been described, and the descriptions of both the apparatus and method inventions may be complementarily applied.

The various embodiments have been described in the best form for implementing the disclosure.

INDUSTRIAL APPLICABILITY

The disclosure is used in a series of vehicle communication fields.

It is evident to those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A communication method of a V2X communication apparatus, comprising:
   accessing a control channel (CCH) using a CCH transceiver; and
   accessing a service channel (SCH) using an SCH transceiver,
   wherein accessing the SCH comprises:
   accessing a first SCH and receiving a safety message or first service information message during a first interval, wherein the service information message indicates an available service and communication access technology information for service reception;
   receiving service in the first SCH based on the first service information message or accessing a second SCH during a second interval contiguous to the first interval; and
   receiving a safety message or second service information message during a third interval when the second SCH is accessed.

2. The communication method of claim 1,
   wherein accessing the first SCH and accessing the second SCH are synchronized each other, and
   wherein a start timing of the third interval is contiguous to an end timing of the first interval.

3. The communication method of claim 1,
   wherein the CCH access and the SCH access are performed based on a sync interval,
   wherein the sync interval for the first SCH comprises the first interval and the second interval, and
   wherein the sync interval for the second SCH comprises the third interval and a fourth interval.

4. The communication method of claim 3, further comprising:
   receiving service in the second SCH based on the second service information message or accessing the first SCH during the fourth interval.

5. The communication method of claim 3, further comprising:
   receiving service in the second SCH based on the second service information message or accessing the third SCH during the fourth interval; and
   receiving a safety message or third service information message during a fifth interval when the third SCH is accessed.

6. The communication method of claim 5,
   wherein the first SCH access, the second SCH access and the third SCH access are synchronized,
   wherein a start timing of the third interval is contiguous to an end timing of the first interval, and
   wherein a start timing of the fifth interval is contiguous to an end timing of the third interval.

7. A V2X communication apparatus, comprising:
   a memory storing data;
   a communication unit transmitting or receiving a radio signal, wherein the communication unit comprises a control channel (CCH) transceiver accessing and communicating with a CCH and a service channel (SCH) transceiver accessing and communicating with an SCH; and
   a processor configured to control the communication unit,
   wherein the V2X communication apparatus is configured to:
   access a first SCH and receive a safety message or first service information message during a first interval, wherein the service information message indicates an available service and communication access technology information for service reception,
   receive service in the first SCH based on the first service information message or access a second SCH during a second interval contiguous to the first interval, and receive a safety message or second service information message during a third interval when the second SCH is accessed.

8. The communication apparatus of claim 7,
wherein accessing the first SCH and accessing the second SCH are synchronized each other, and
wherein a start timing of the third interval is contiguous to an end timing of the first interval.

9. The communication apparatus of claim 7,
wherein the CCH access and the SCH access are performed based on a sync interval,
wherein the sync interval for the first SCH comprises the first interval and the second interval, and
wherein the sync interval for the second SCH comprises the third interval and a fourth interval.

10. The communication apparatus of claim 9,
wherein service is received in the second SCH based on the second service information message or the first SCH is accessed during the fourth interval.

11. The communication apparatus of claim 9,
wherein service is received in the second SCH based on the second service information message or the third SCH is accessed during the fourth interval; and
wherein a safety message or third service information message is received during a fifth interval when the third SCH is accessed.

12. The communication apparatus of claim 11,
wherein the first SCH access, the second SCH access and the third SCH access are synchronized,
wherein a start timing of the third interval is contiguous to an end timing of the first interval, and
wherein a start timing of the fifth interval is contiguous to an end timing of the third interval.

13. A communication method of a V2X communication apparatus, comprising:
    accessing a control channel (CCH) using a CCH transceiver; and
    accessing a service channel (SCH) using an SCH transceiver,
    wherein accessing the SCH comprises:
    accessing a first channel band and receiving a safety message or first service information message during a first interval, wherein the service information message indicates available service information and communication access technology information for service reception;
    receiving service in the first channel band based on the first service information message or accessing a second channel band during a second interval contiguous to the first interval; and
    receiving a safety message or second service information message during a third interval when the second channel band is accessed.

14. The communication method of claim 13,
wherein accessing the first channel band and accessing the second channel band are synchronized, and
wherein a start timing of the third interval is contiguous to an end timing of the first interval.

15. The communication method of claim 13,
wherein each of the first channel band and the second channel band comprises a plurality of SCHs, and
wherein sync intervals for the plurality of SCHs included in each channel band are identical.

* * * * *